(12) United States Patent
Blachnitzky et al.

(10) Patent No.: US 12,412,353 B1
(45) Date of Patent: Sep. 9, 2025

(54) ANCHORING TO MULTIPLE POSITIONS OF AN AUXILIARY DEVICE

(71) Applicant: Apple Inc., Cupertino, CA (US)

(72) Inventors: Benjamin R. Blachnitzky, San Francisco, CA (US); Aaron M. Burns, Sunnyvale, CA (US); Anette L Freiin von Kapri, Mountain View, CA (US); Arun Rakesh Yoganandan, San Francisco, CA (US); Jue Wang, Sunnyvale, CA (US); Michelle Chua, Seattle, WA (US); Zachary Z. Becker, Issaquah, WA (US)

(73) Assignee: APPLE INC., Cupertino, CA (US)

(*) Notice: Subject to any disclaimer, the term of this patent is extended or adjusted under 35 U.S.C. 154(b) by 270 days.

(21) Appl. No.: 18/213,044

(22) Filed: Jun. 22, 2023

Related U.S. Application Data

(60) Provisional application No. 63/356,674, filed on Jun. 29, 2022.

(51) Int. Cl.
*G06T 19/20* (2011.01)
*G06F 3/01* (2006.01)
*G06F 3/0354* (2013.01)
*G06F 3/04883* (2022.01)

(52) U.S. Cl.
CPC .............. *G06T 19/20* (2013.01); *G06F 3/013* (2013.01); *G06F 3/03545* (2013.01); *G06F 3/04883* (2013.01); *G06T 2219/2004* (2013.01)

(58) Field of Classification Search
CPC ...................................................... G06T 19/20
See application file for complete search history.

(56) References Cited

U.S. PATENT DOCUMENTS

| | | | |
|---|---|---|---|
| 10,311,621 B2 | 6/2019 | Chabot | |
| 10,373,381 B2 | 8/2019 | Nuernberger et al. | |
| 11,079,858 B2 | 8/2021 | Lohse et al. | |
| 2016/0041630 A1* | 2/2016 | Hosenpud | G06F 3/03545 345/157 |
| 2017/0061700 A1 | 3/2017 | Urbach et al. | |
| 2019/0294261 A1* | 9/2019 | Lohse | G06F 3/0325 |
| 2023/0325047 A1* | 10/2023 | Georg | G06F 3/04815 715/848 |

* cited by examiner

*Primary Examiner* — Shivang I Patel
(74) *Attorney, Agent, or Firm* — Fernando & Partners, LLP

(57) ABSTRACT

A method is performed at an electronic device with a non-transitory memory, one or more processors, and a display. The method includes obtaining positional information regarding an auxiliary device. The method includes determining an anchor point of the auxiliary device on a volumetric computer-generated object. Determining the anchor point includes setting the anchor point to a first position of the auxiliary device in accordance with a determination that dimensions of the volumetric computer-generated satisfy a first criterion. Determining the anchor point further includes setting the anchor point to a second position of the auxiliary device in accordance with a determination that the dimensions of the volumetric computer-generated object satisfy a second criterion different from the first criterion. The first position is different from the second position. The method includes anchoring, based on the positional information, the volumetric computer-generated object to the anchor point of the auxiliary device.

20 Claims, 23 Drawing Sheets

ANCHORING TO MULTIPLE POSITIONS OF AN AUXILIARY DEVICE

CROSS-REFERENCE TO RELATED APPLICATIONS

This application claims the benefit of U.S. Provisional Patent App. No. 63/356,674, filed on Jun. 29, 2022, which is incorporated by reference in its entirety.

TECHNICAL FIELD

The present disclosure relates to displaying a computer-generated object, and in particular, manipulating the computer-generated object.

BACKGROUND

Accurately and efficiently determining user engagement with respect to a volumetric computer-generated object is difficult. A device, displaying the volumetric computer-generated object, may determine a false positive that a hand of a user selects or manipulates the volumetric computer-generated object. For example, the device may not accurately determine a user engagement when a volumetric computer-generated object has a large depth relative to the device.

SUMMARY

In accordance with some implementations, a method is performed at an electronic device with a non-transitory memory, one or more processors, and a display. The method includes obtaining positional information regarding an auxiliary device. The method includes determining an anchor point of the auxiliary device based on a volumetric computer-generated object. Determining the anchor point includes setting the anchor point to a first position of the auxiliary device in accordance with a determination that dimensions of the volumetric computer-generated object satisfy a first criterion. Determining the anchor point further includes setting the anchor point to a second position of the auxiliary device in accordance with a determination that the dimensions of the volumetric computer-generated object satisfy a second criterion different from the first criterion. The first position is different from the second position. The method includes anchoring, based on the positional information, the volumetric computer-generated object to the anchor point of the auxiliary device.

In accordance with some implementations, an electronic device includes one or more processors, a non-transitory memory, and a display. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
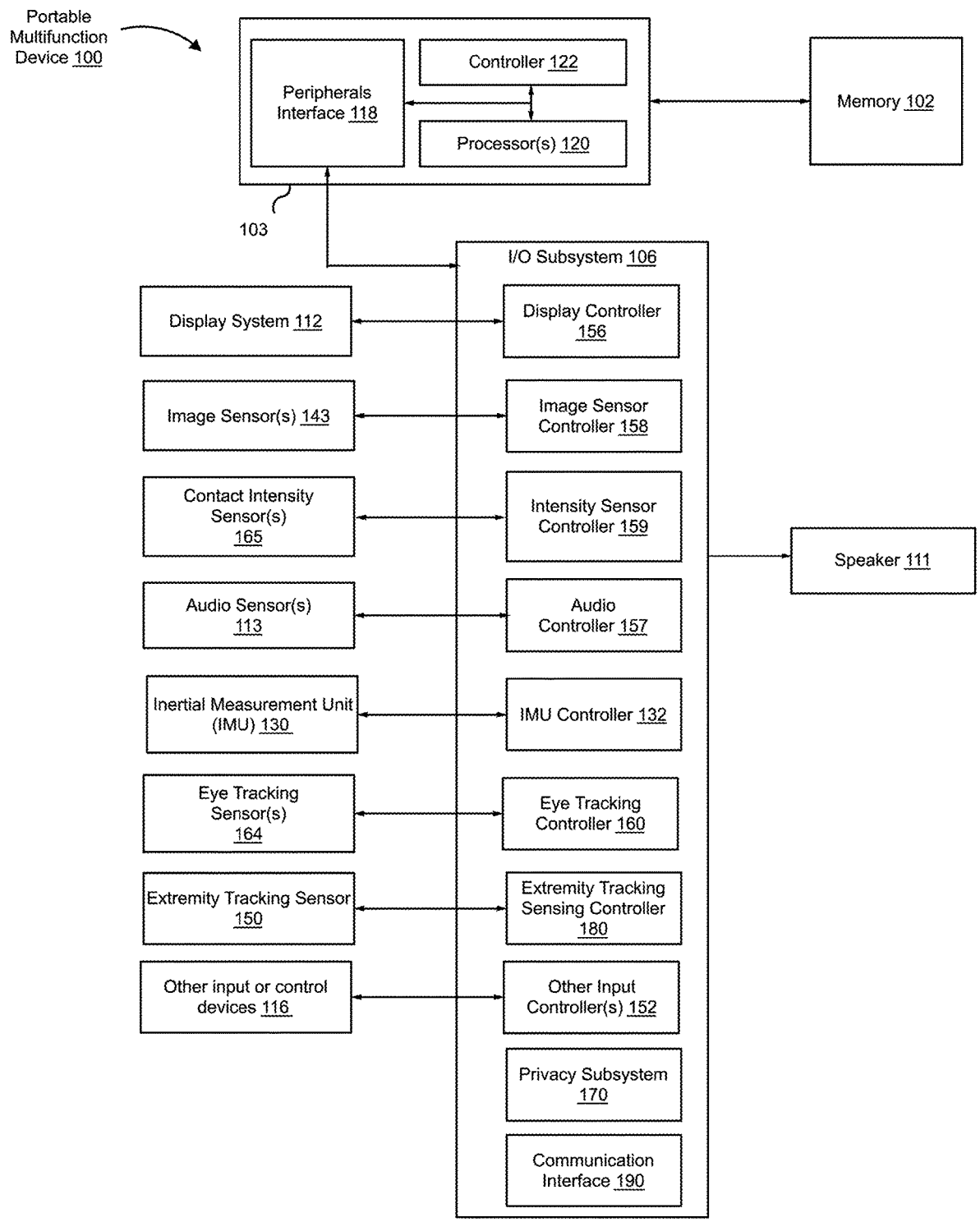
FIG. 1 is a block diagram of an example of a portable multifunction device in accordance with some implementations.

Accurately and efficiently determining user engagement with respect to a volumetric computer-generated object is difficult. A device may display a volumetric computer-generated object, and the device may include a tracking system for determining one or more user engagements (e.g., selection, spatial manipulation) with respect to the volumetric computer-generated object. For example, the tracking system may determine positions of an extremity of a user, and use the positions to determine whether the extremity is proximate to the volumetric computer-generated object. However, under various circumstances, the tracking system may not accurately determine whether the extremity is proximate to the volumetric computer-generated object. For example, the tracking system may struggle to accurately determine a user engagement when a volumetric computer-generated object has a large depth relative to the device.

By contrast, various implementations disclosed herein include methods, electronic devices, and systems for anchoring a volumetric computer-generated object to an anchor point of an auxiliary device, based on positional information regarding the auxiliary device. For example, the electronic device may determine the positional information based on a combination of image data of the auxiliary device and positional sensor data from a positional sensor of the auxiliary device. Using the positional information enables a more accurate manipulation of the volumetric computer-generated object, as compared with other systems. While the electronic device anchors the volumetric computer-generated object to the anchor point, the electronic device manipulates the volumetric computer-generated object based on a corresponding movement of the auxiliary device.

Moreover, according to various implementations, the electronic device determines the anchor point based on dimensions (e.g., size or volume) of the volumetric computer-generated object. For example, the electronic device anchors a larger volumetric computer-generated object to the end of an auxiliary device (e.g., tip of a stylus), and anchors a smaller volumetric computer-generated object to the body of the auxiliary device (e.g., barrel of the stylus).

Foregoing anchoring the larger volumetric computer-generated object to the body avoids a situation in which the body occludes the larger volumetric computer-generated object. Moreover, foregoing anchoring the smaller volumetric computer-generated object to the end leaves the end useable for other purposes, such as a tip of a stylus being useable for a drawing operation.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDS, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, a privacy subsystem 170, and a communication interface 190. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port. Universal Serial Bus (USB) port, stylus, auxiliary device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or an auxiliary device.

In some implementations, the display system 112 corresponds to a display integrated in a head-mountable device (HMD), such as AR glasses. For example, the display system 112 includes a stereo display (e.g., stereo pair display) that provides (e.g., mimics) stereoscopic vision for eyes of a user wearing the HMD.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, an auxiliary device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both cars) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
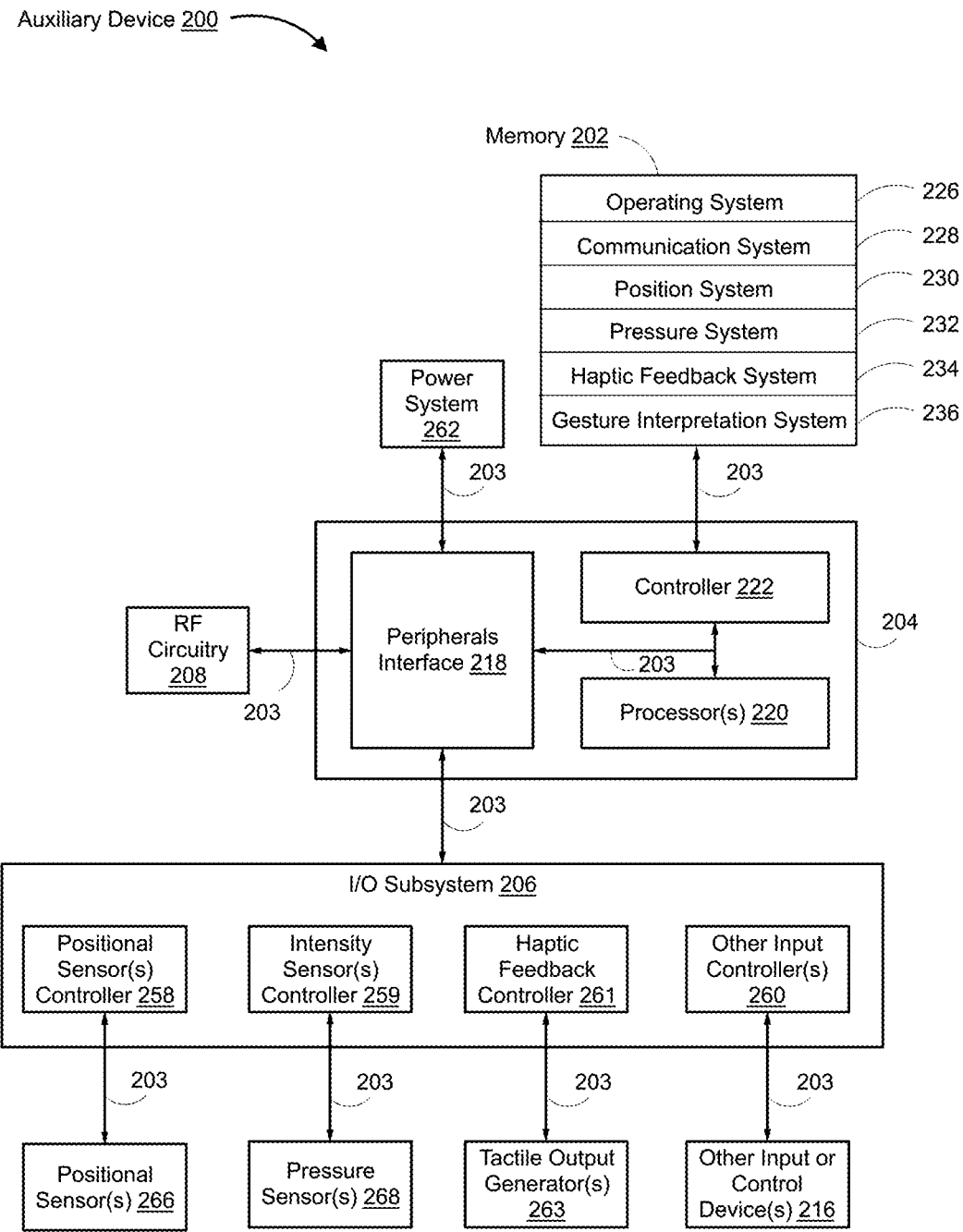
FIG. 2 is a block diagram of an example of an auxiliary device in accordance with some implementations.
Figure 3:
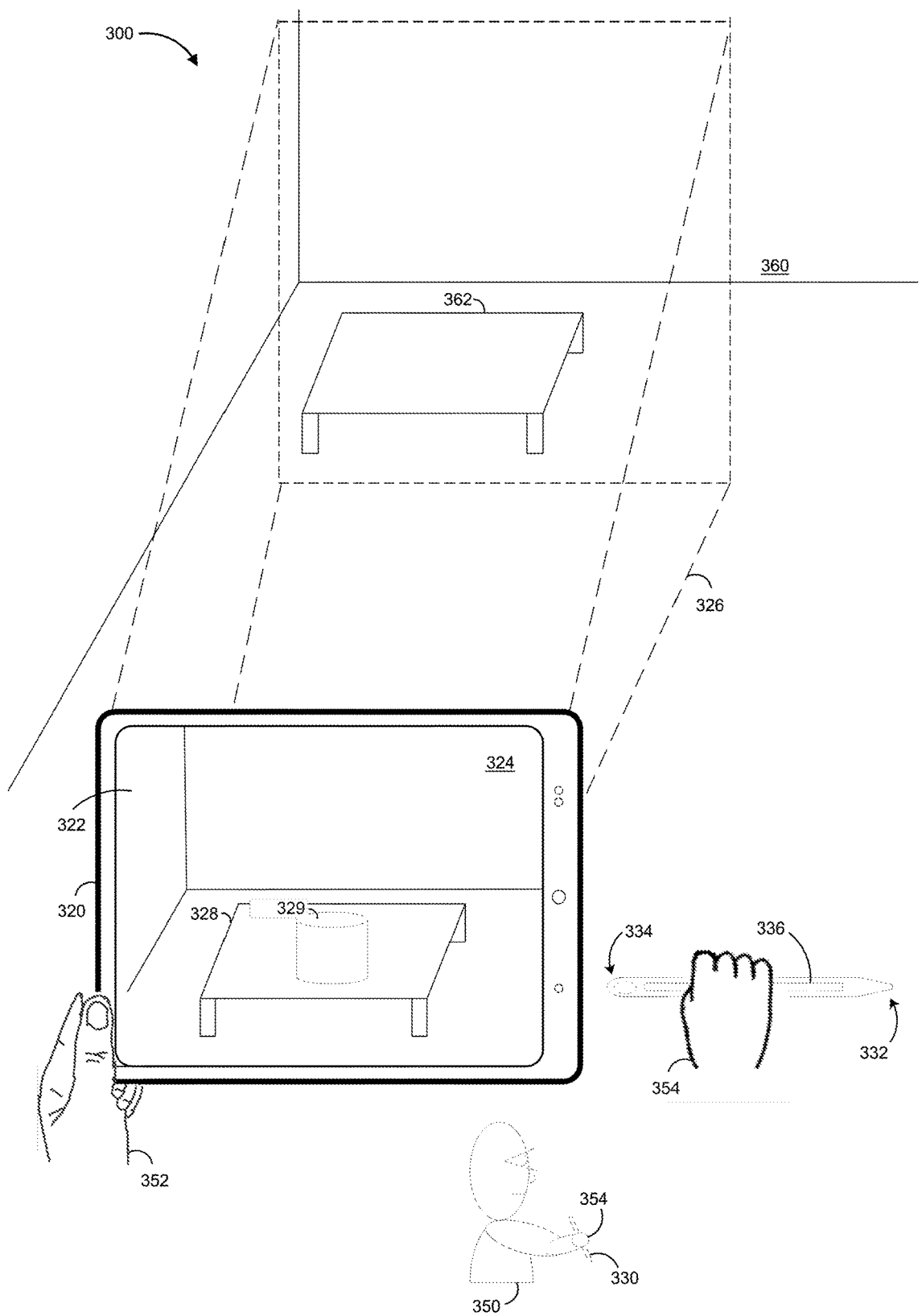
FIG. 3 is an example of a first operating environment in accordance with some implementations.
Figure 4A:
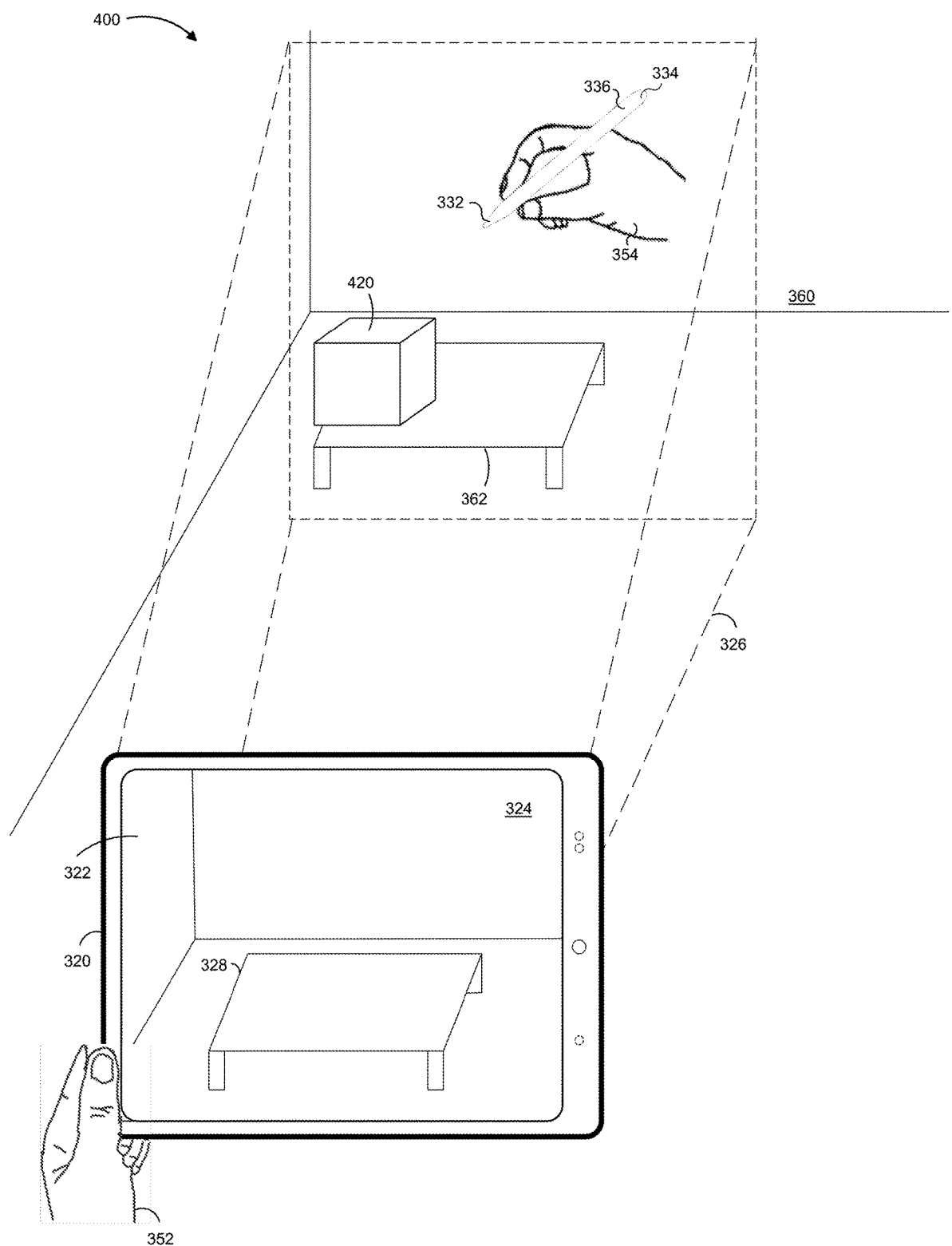
FIGS. 4A-4S are examples of anchoring volumetric computer-generated objects to different positions of an auxiliary device in accordance with some implementations.
Figure 4B:
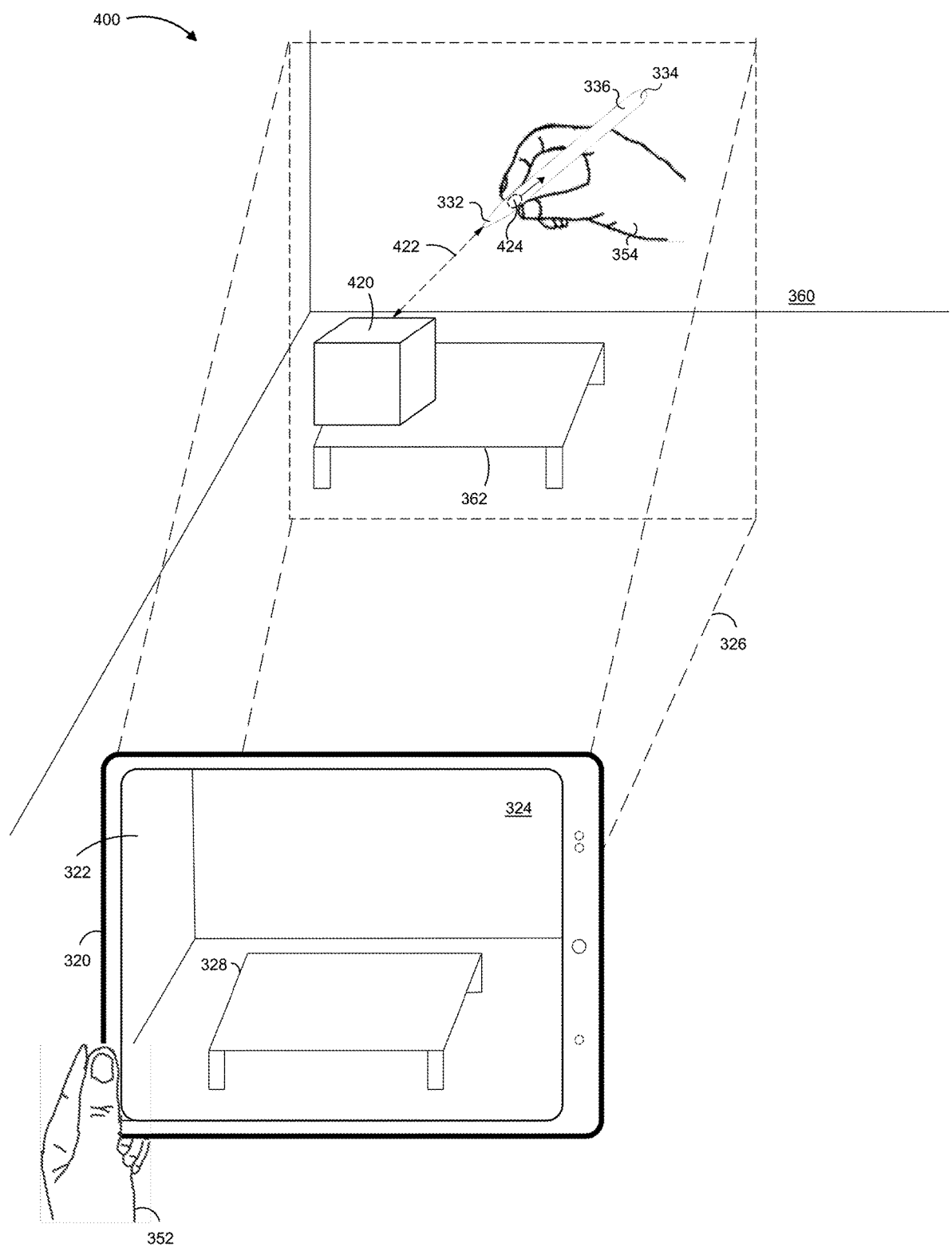
Figure 4C:
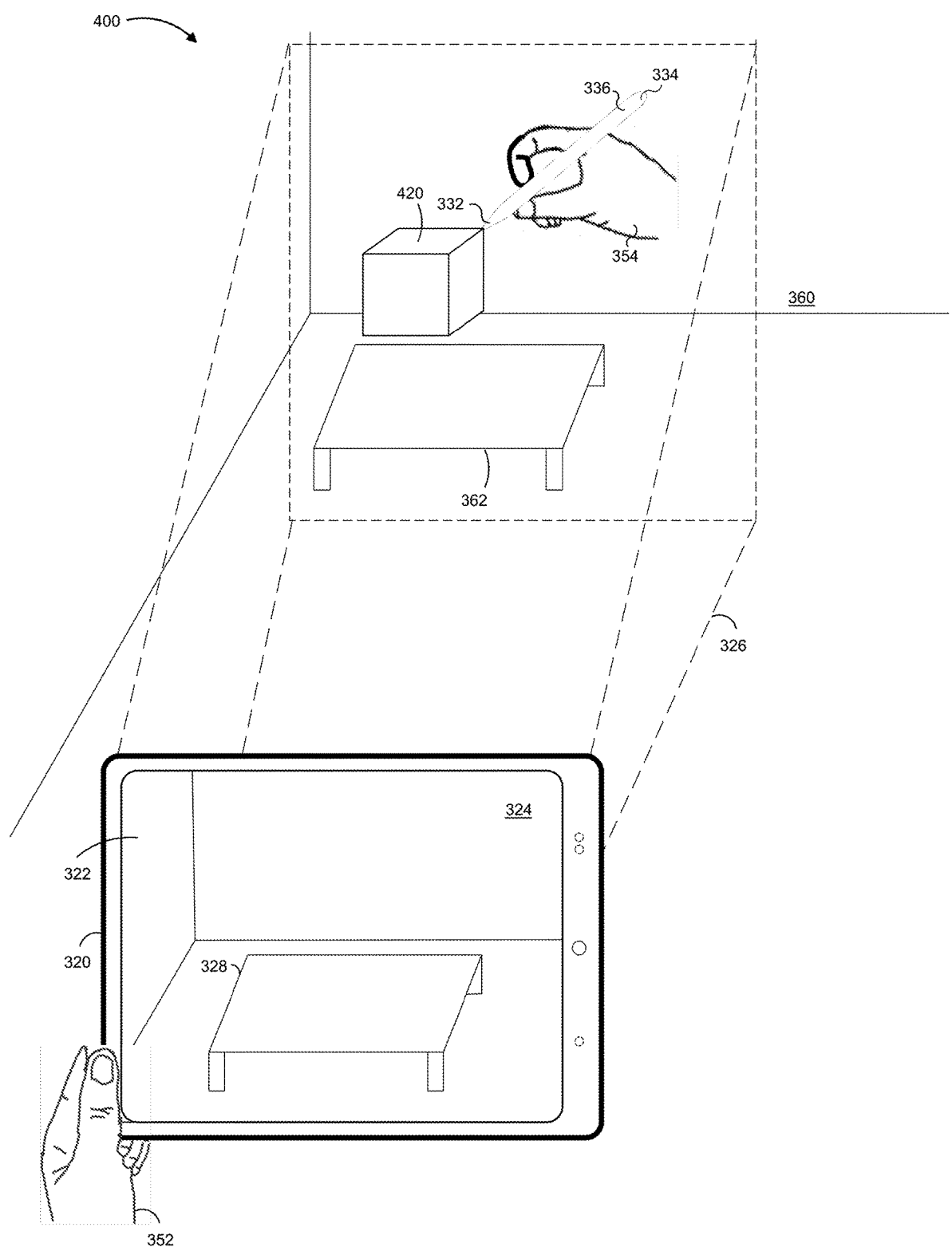
Figure 4D:
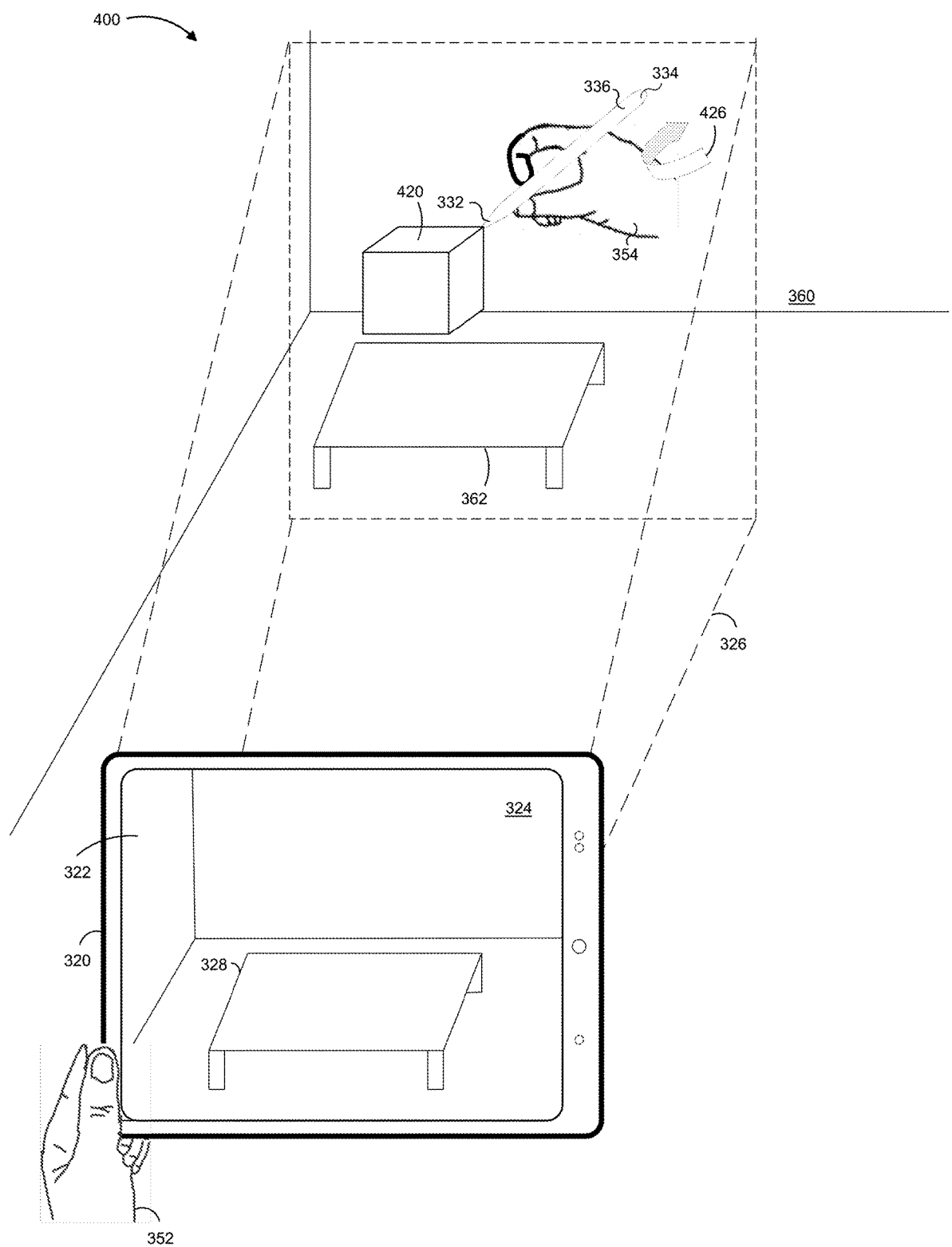
Figure 4E:
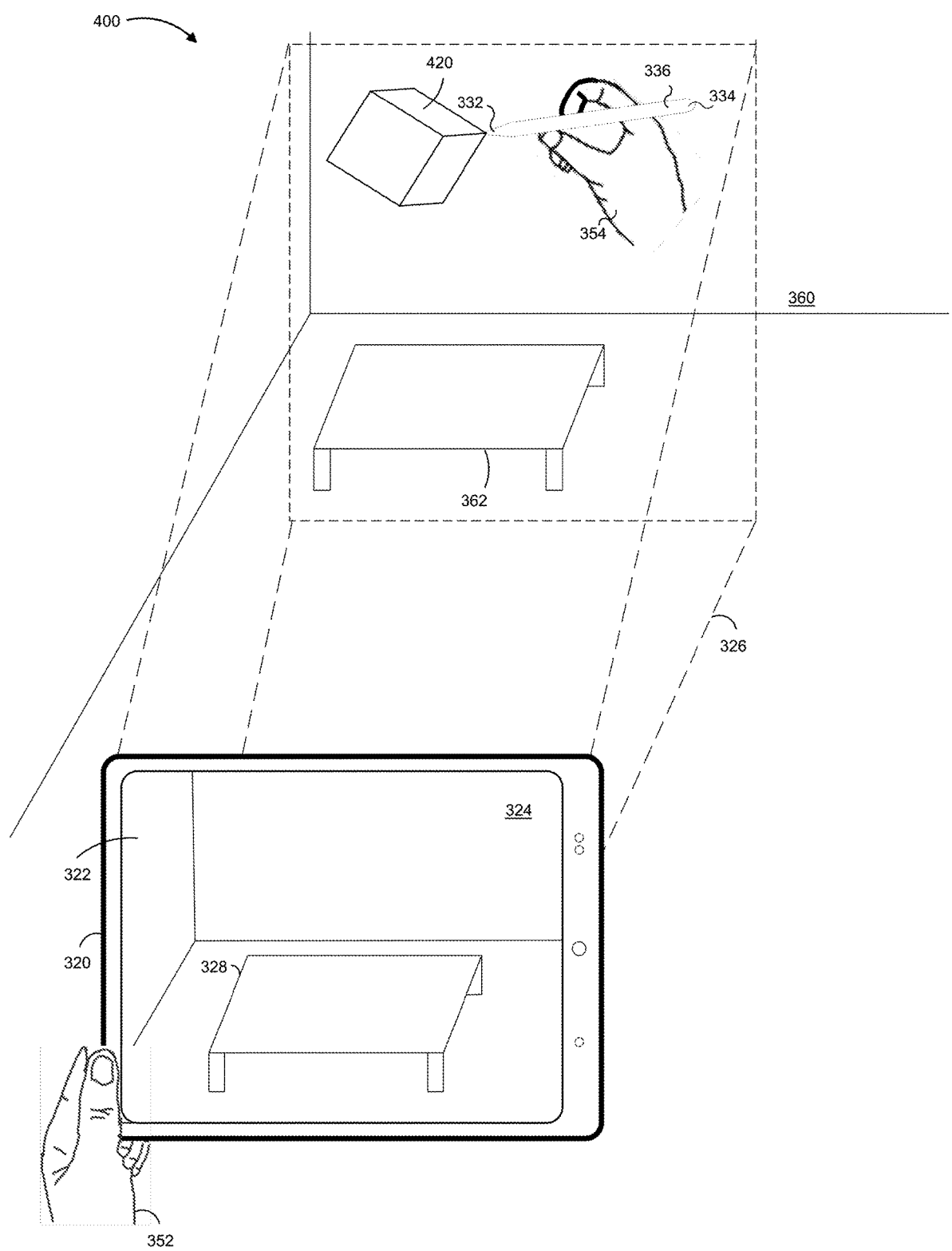
Figure 4F:
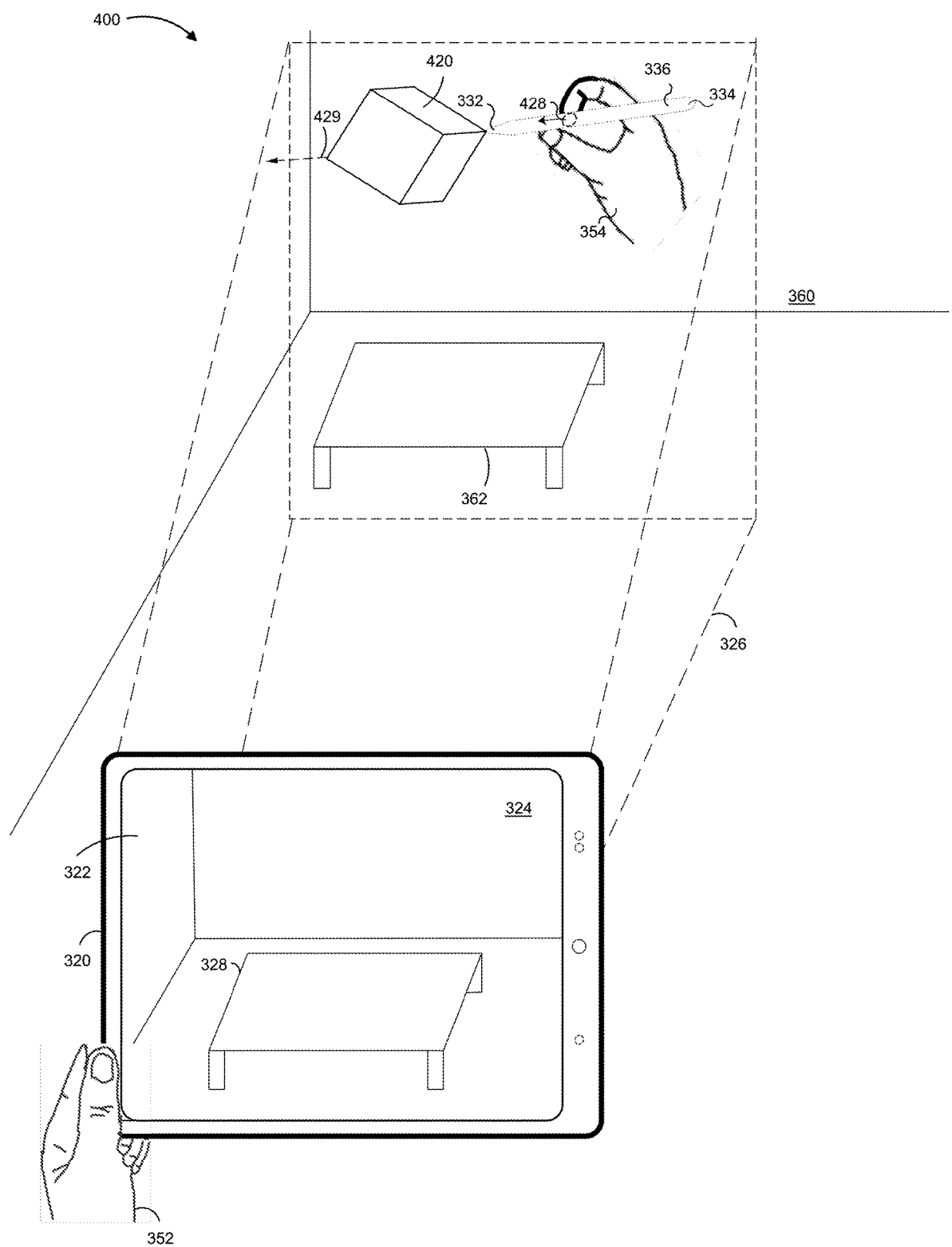
Figure 4G:
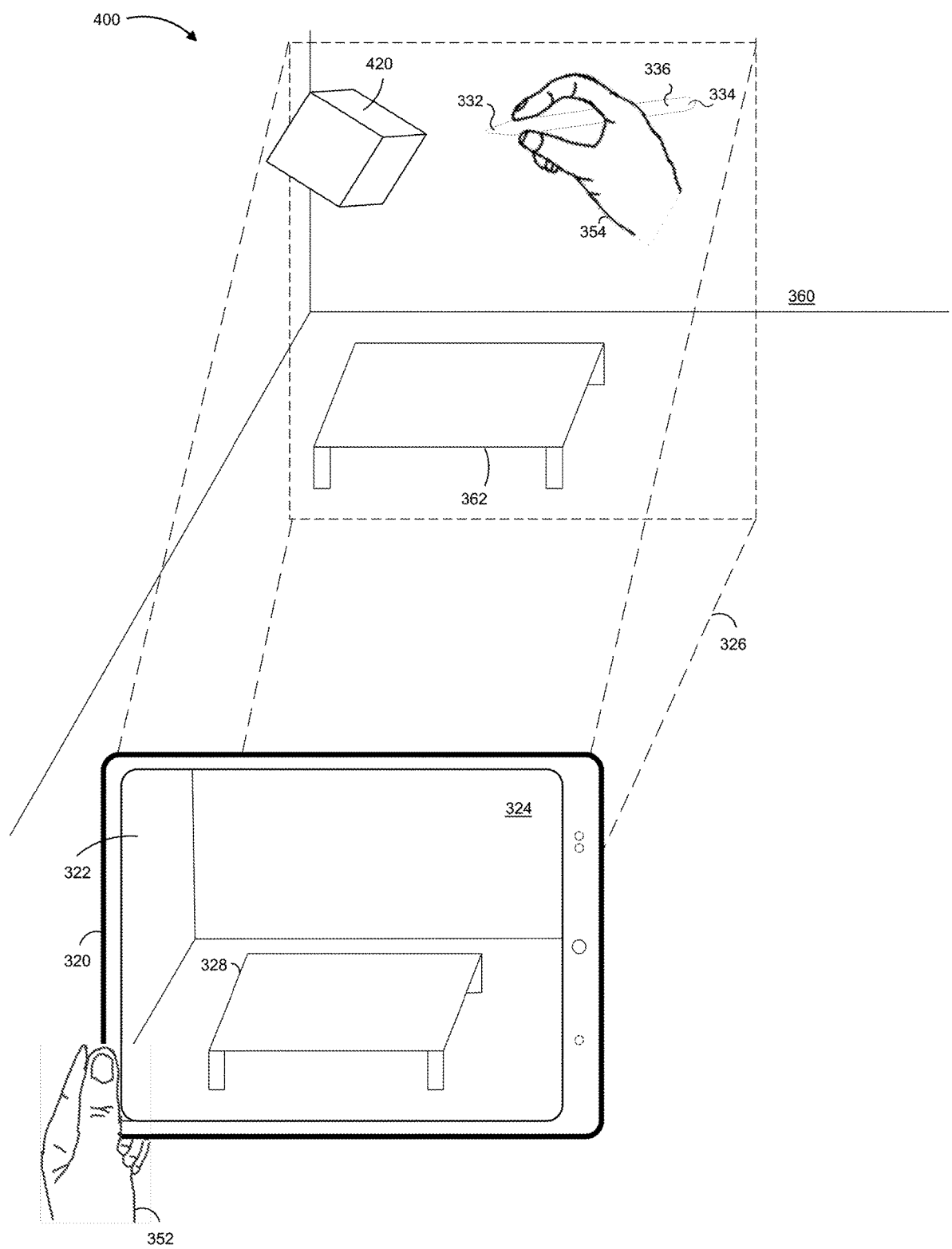
Figure 4H:
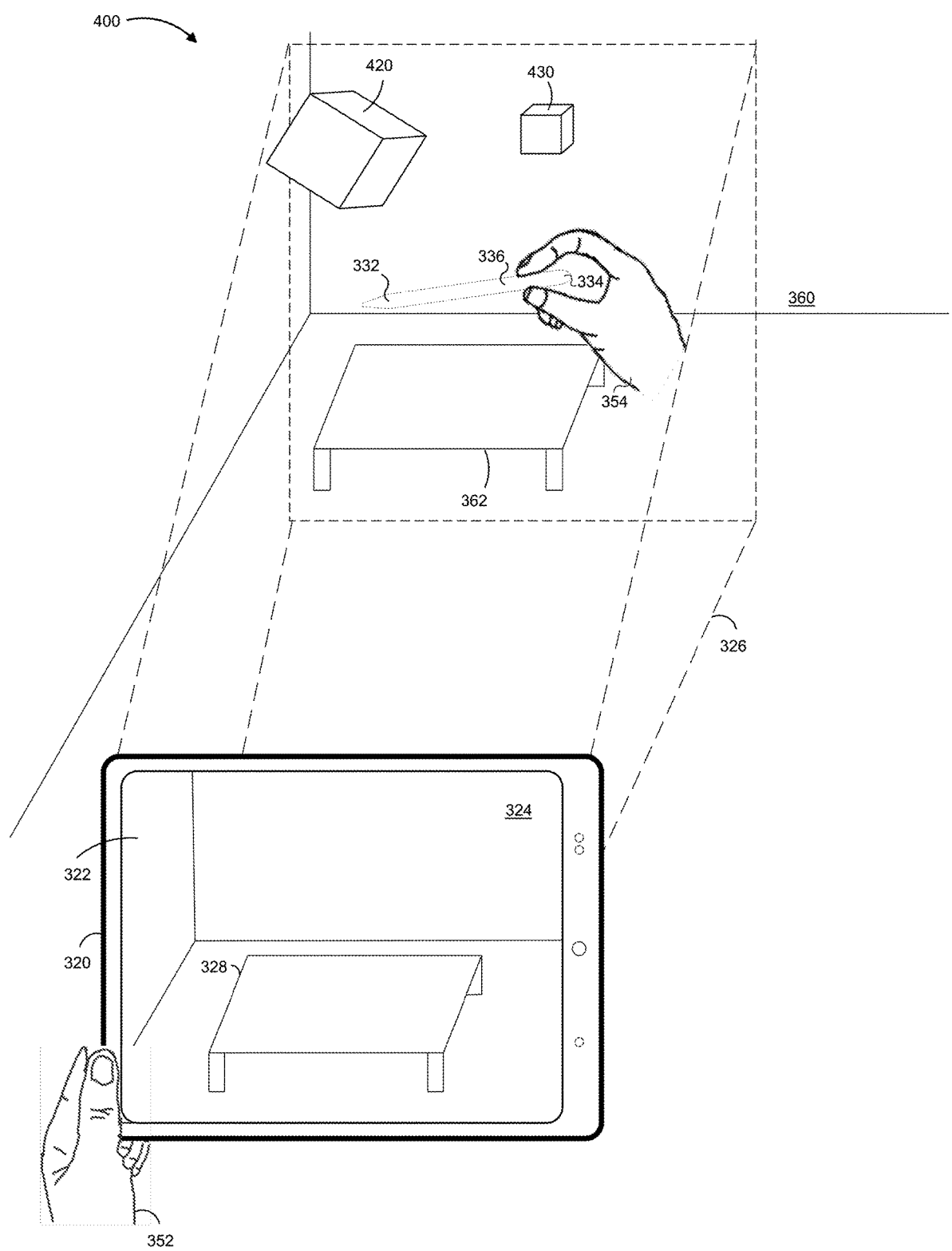
Figure 4I:
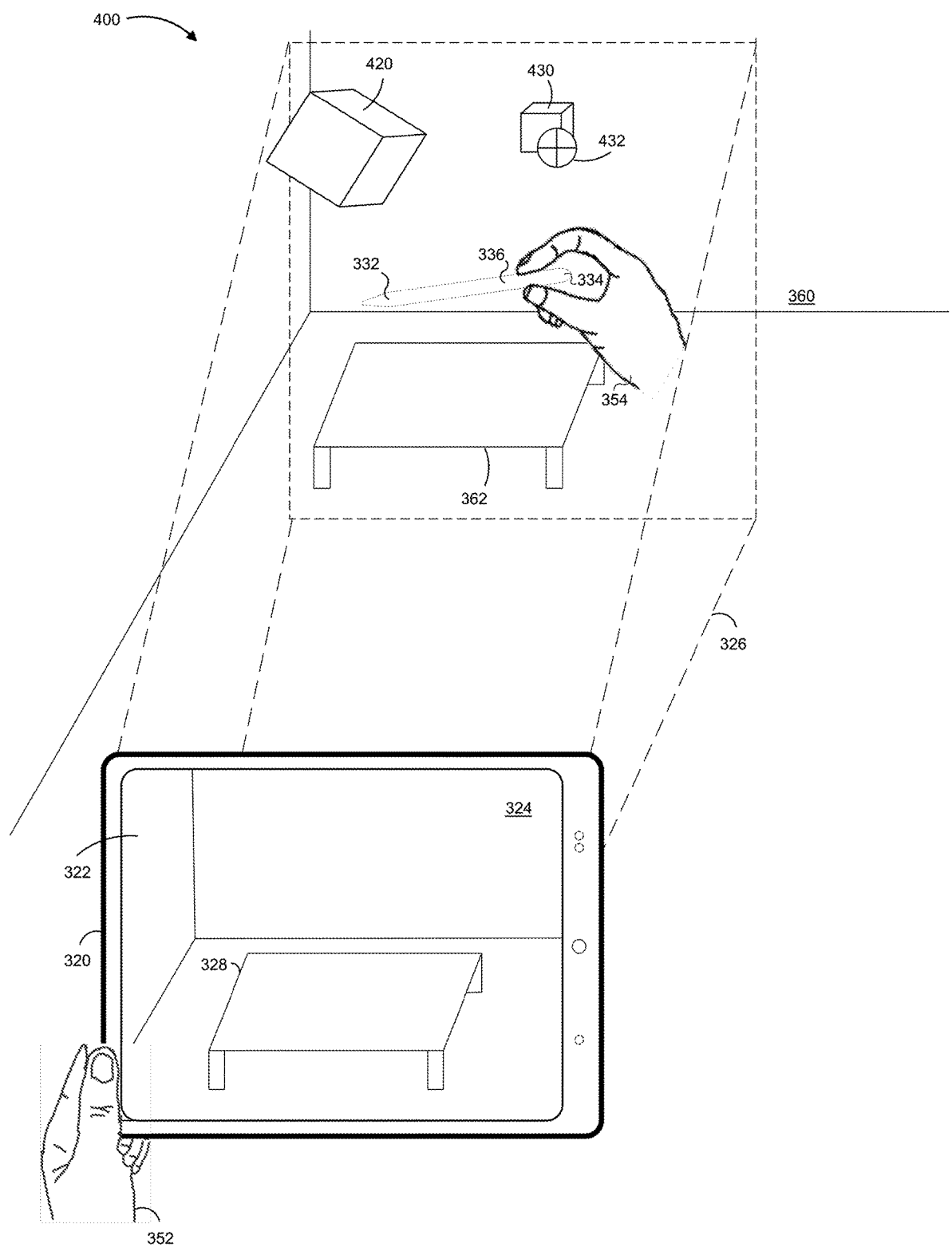
Figure 4J:
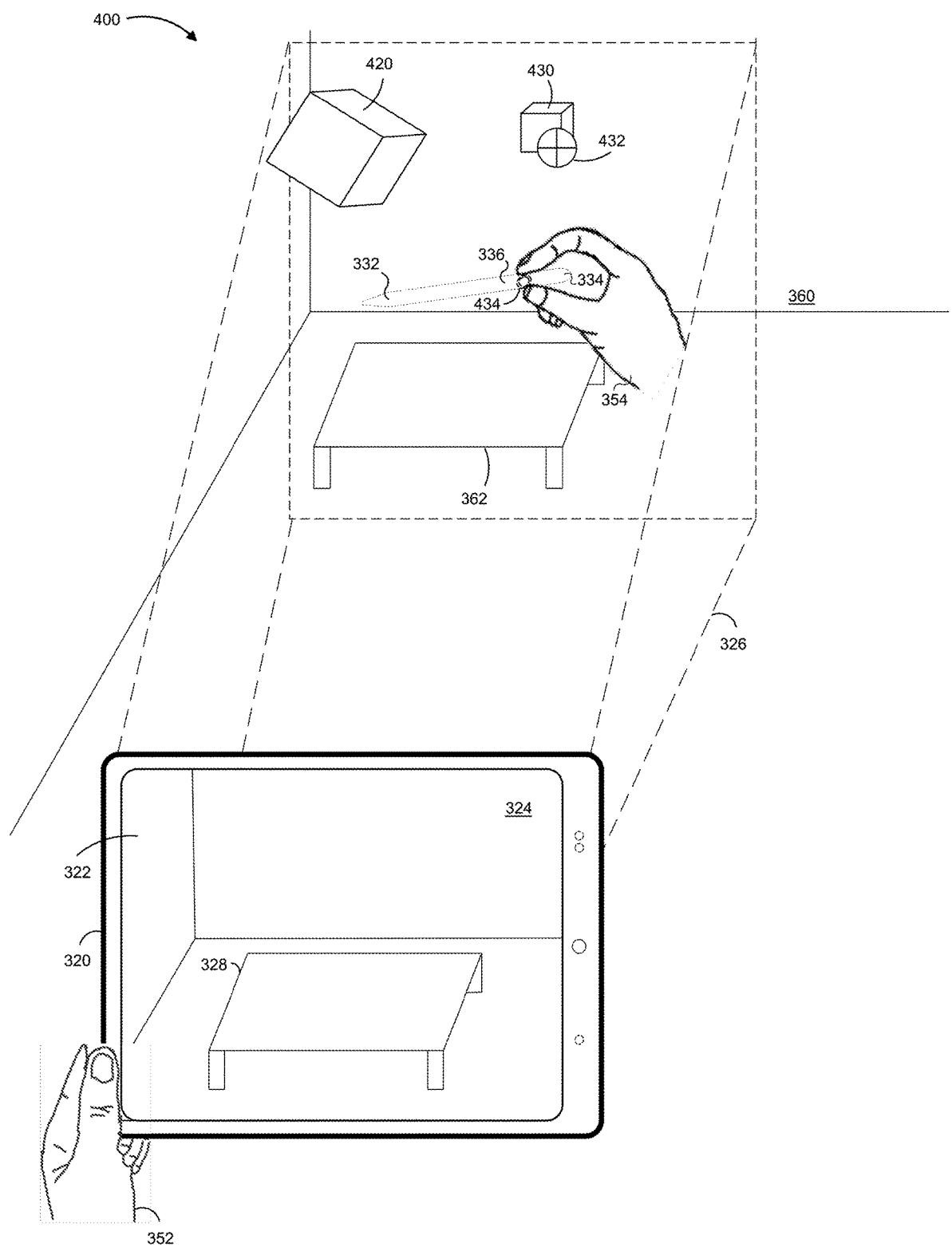
Figure 4K:
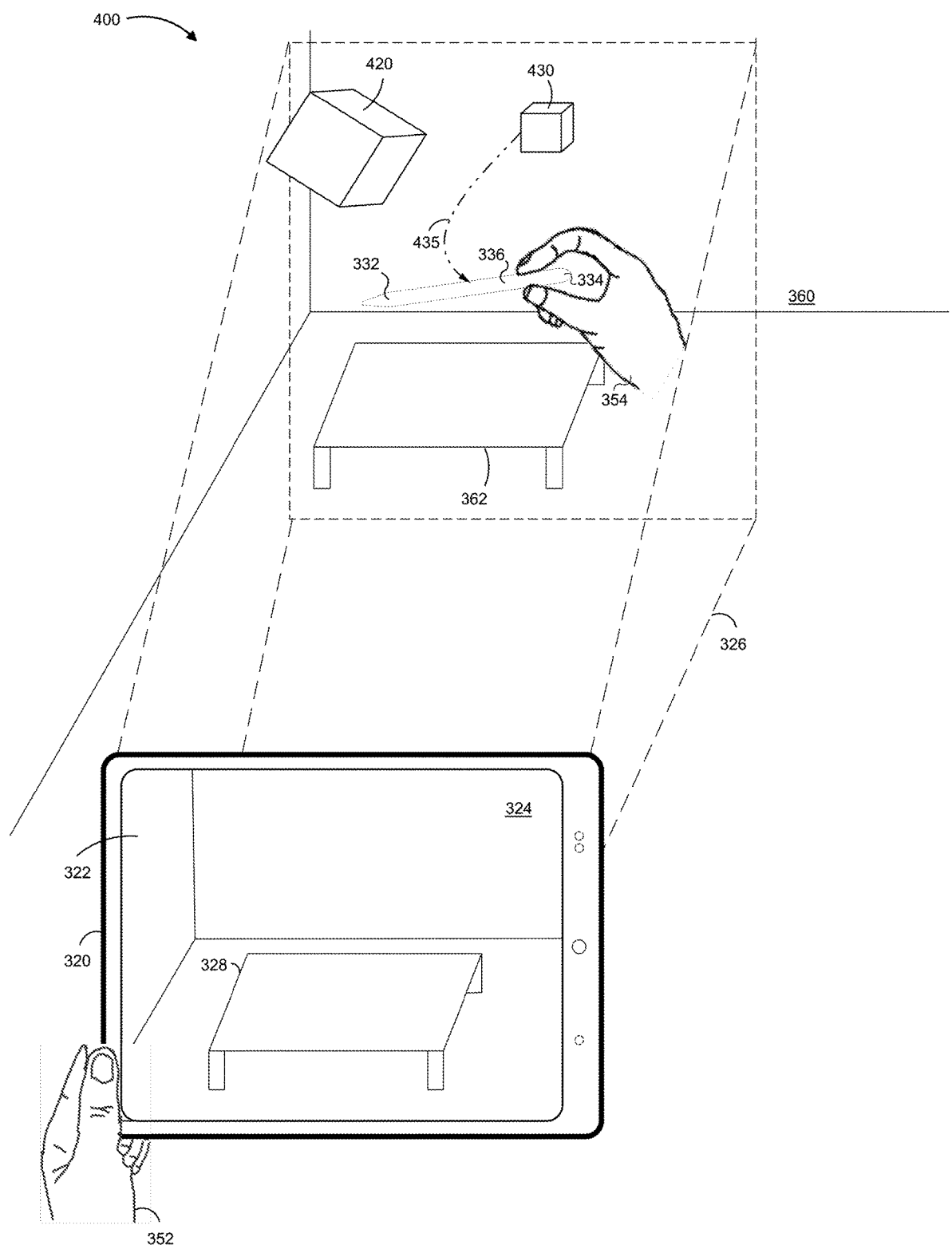
Figure 4L:
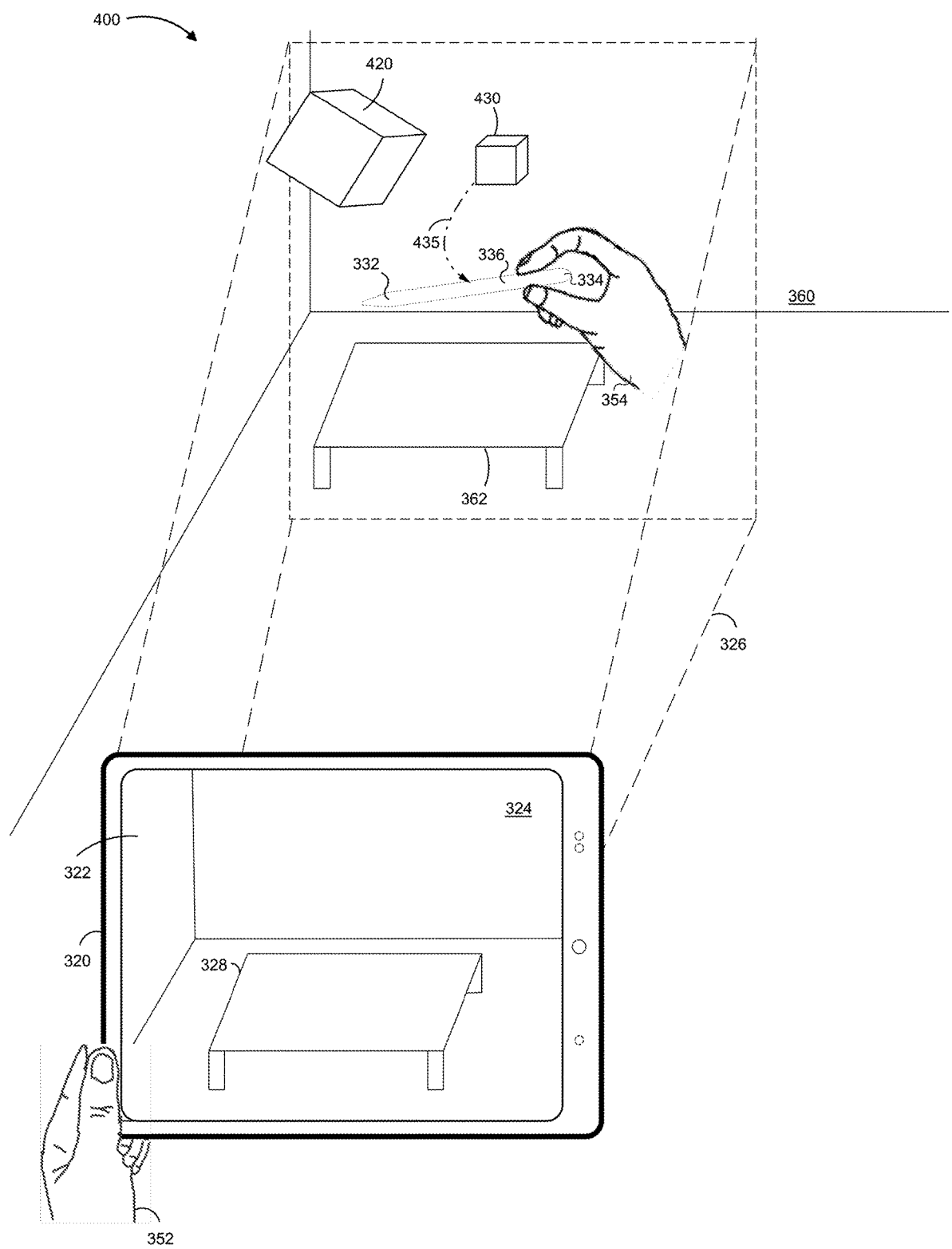
Figure 4M:
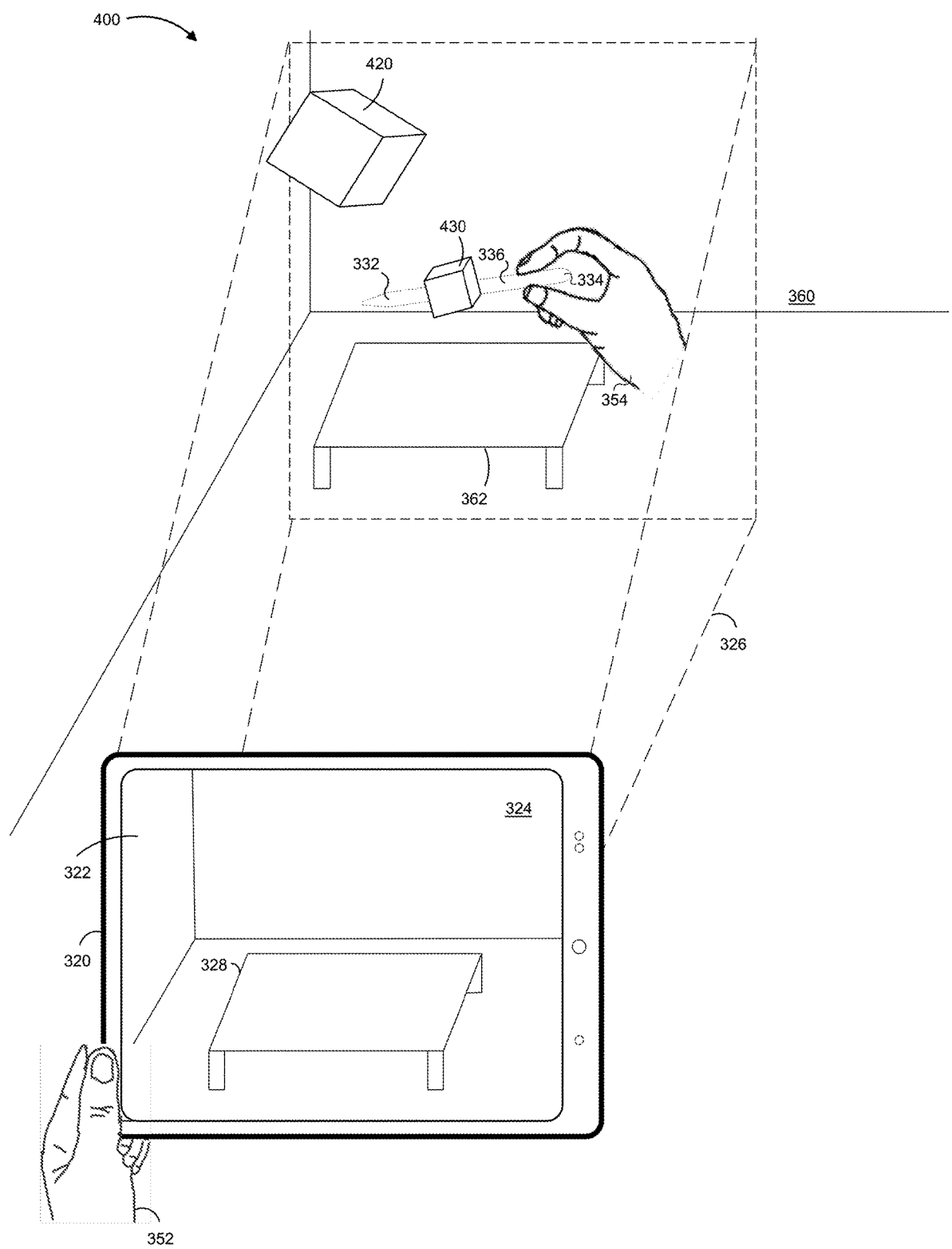
Figure 4N:
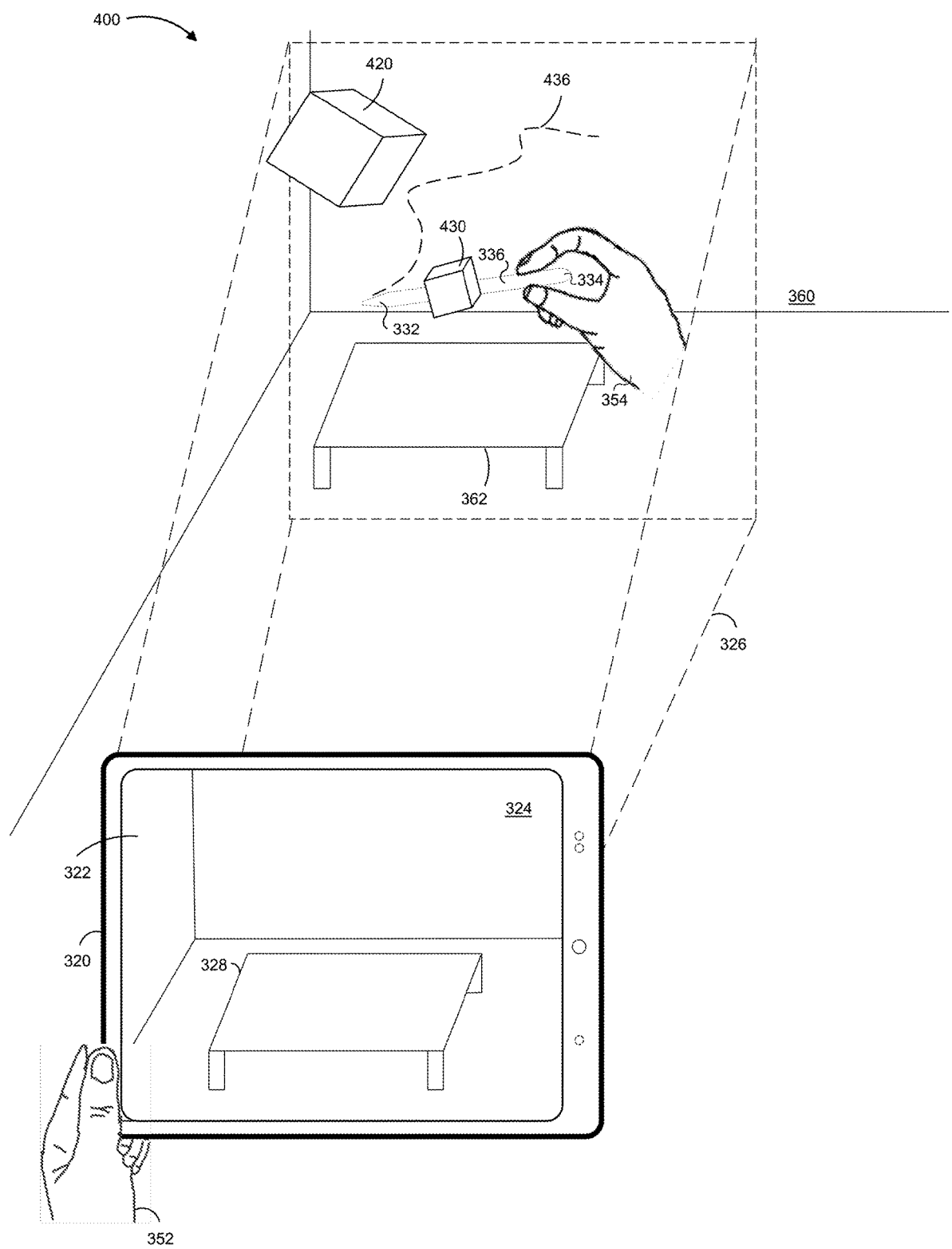
Figure 4O:
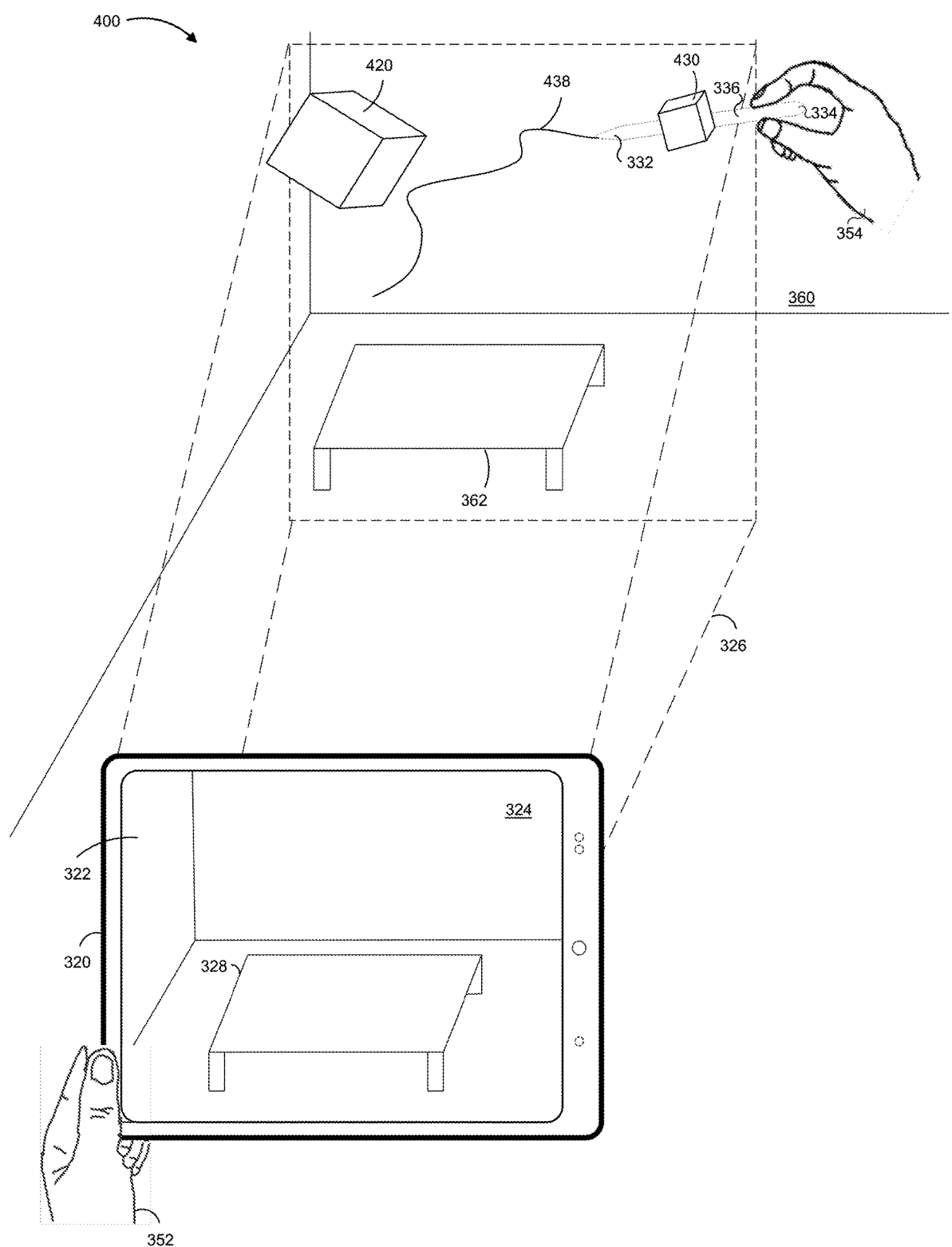
Figure 4P:
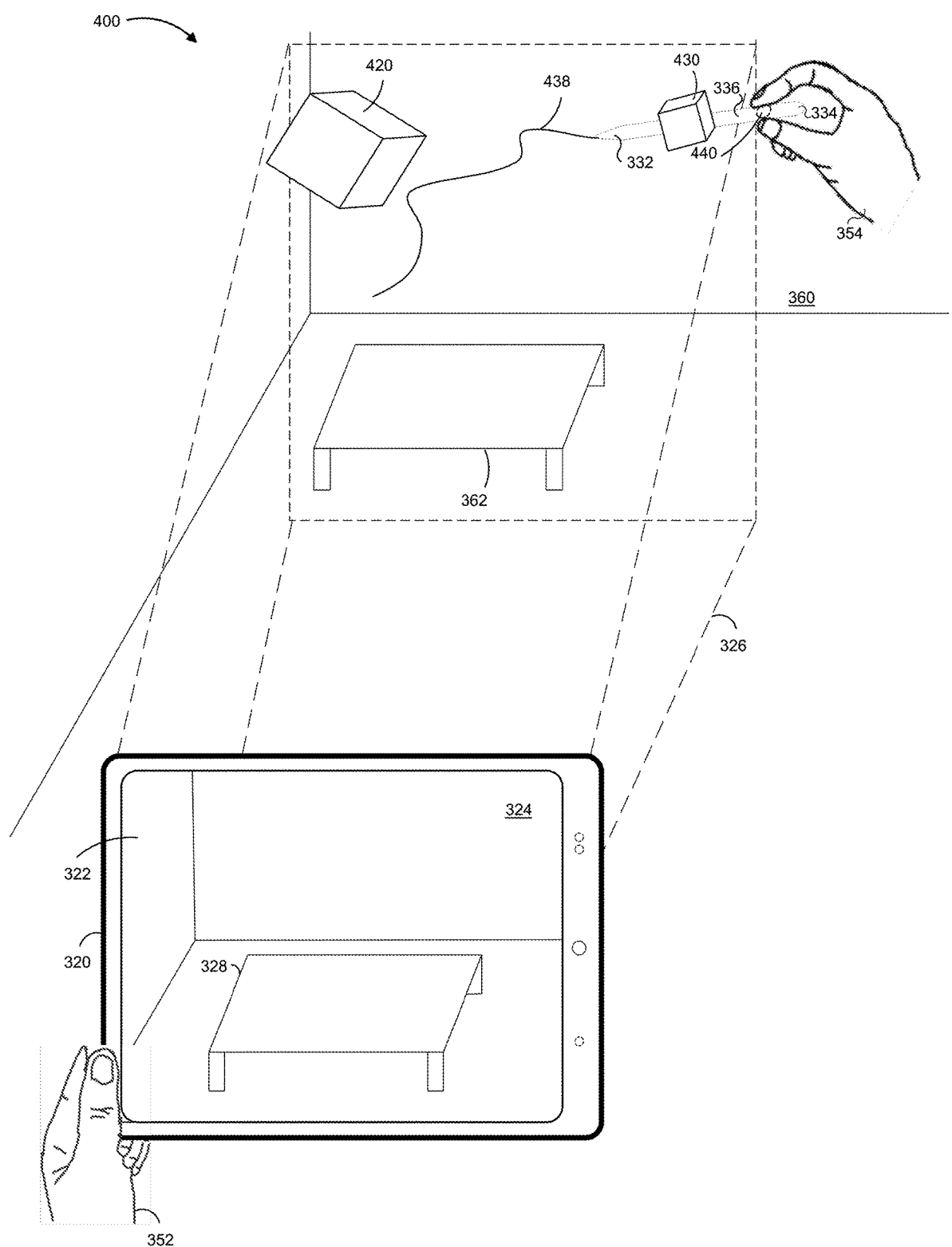
Figure 4Q:
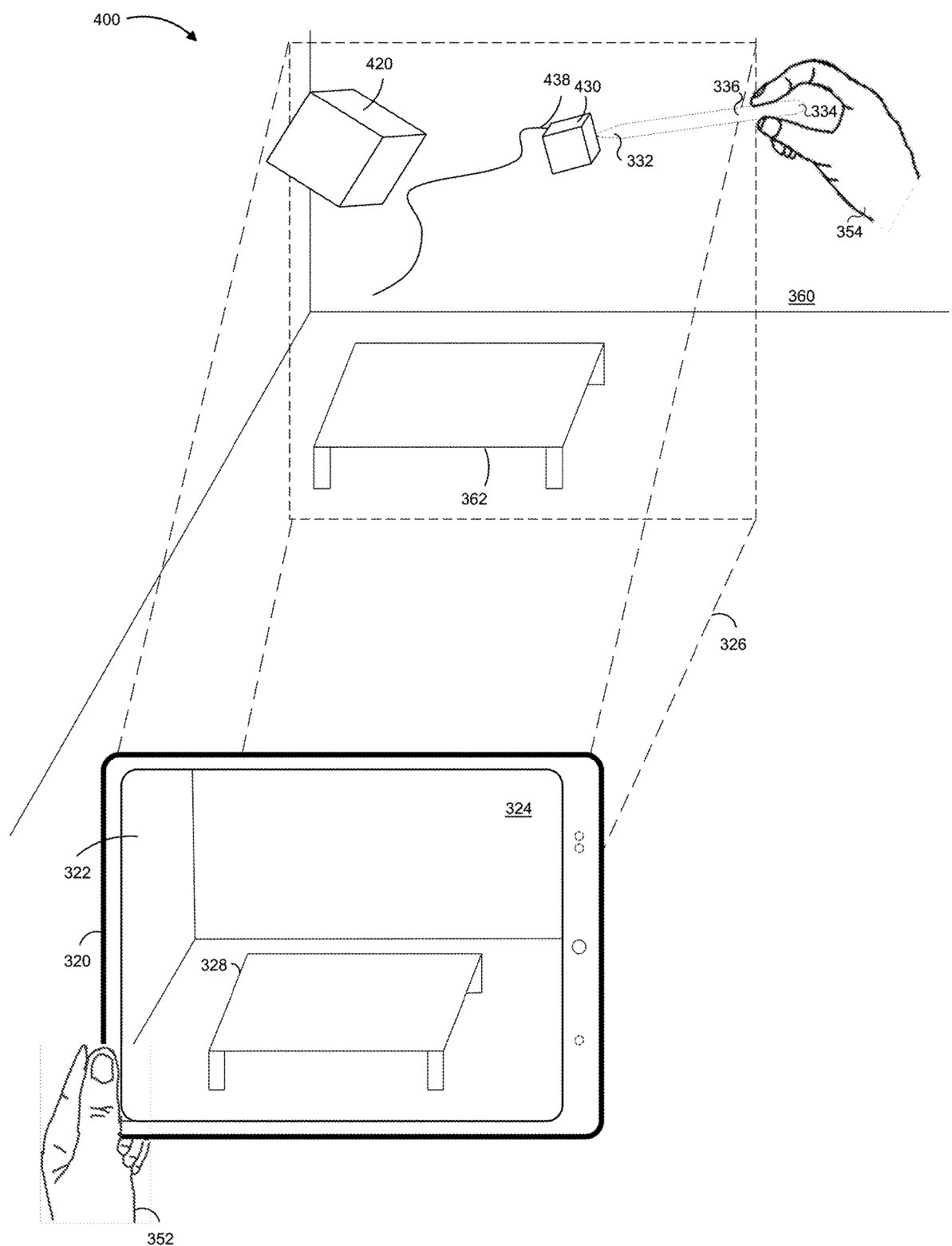
Figure 4R:
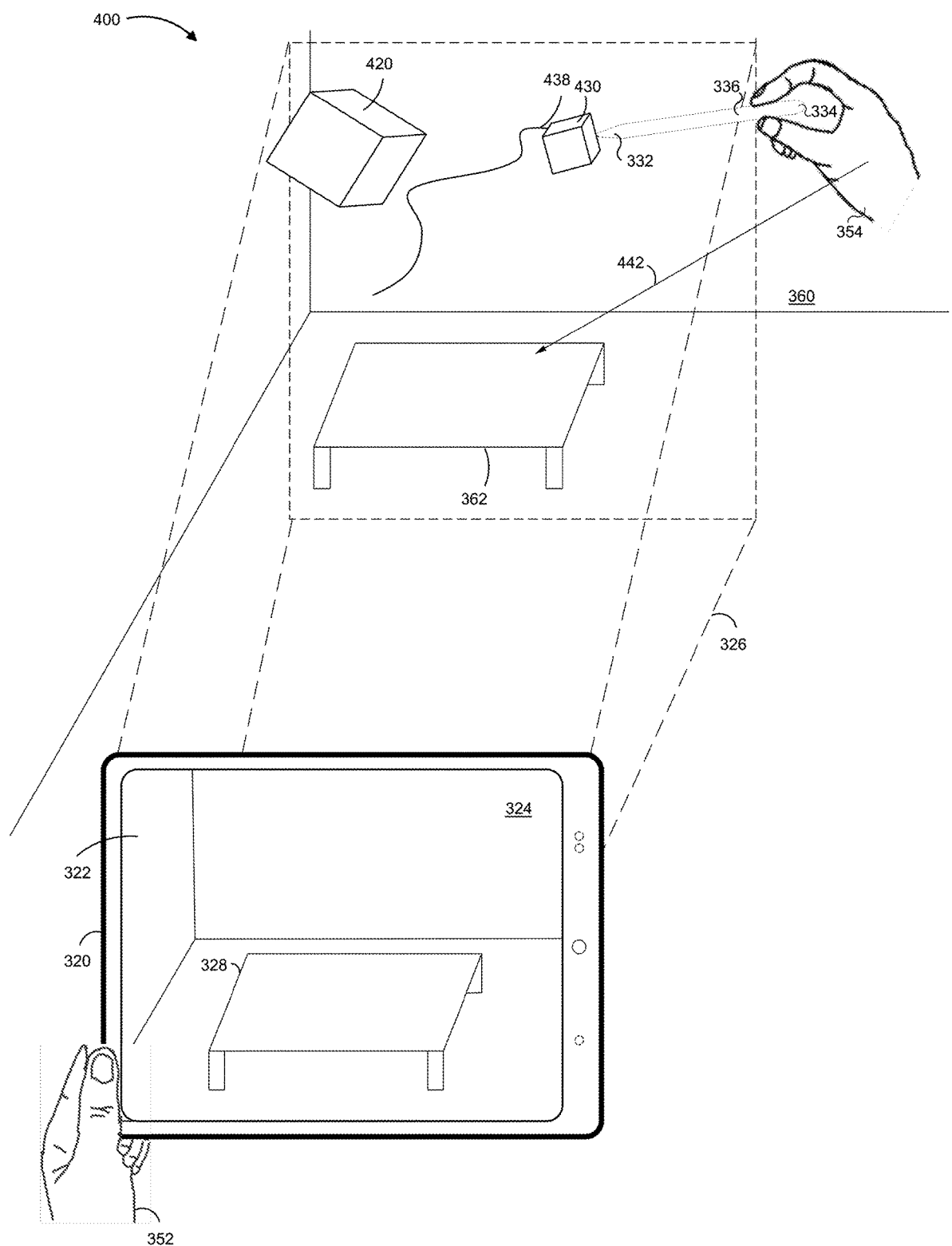
Figure 4S:
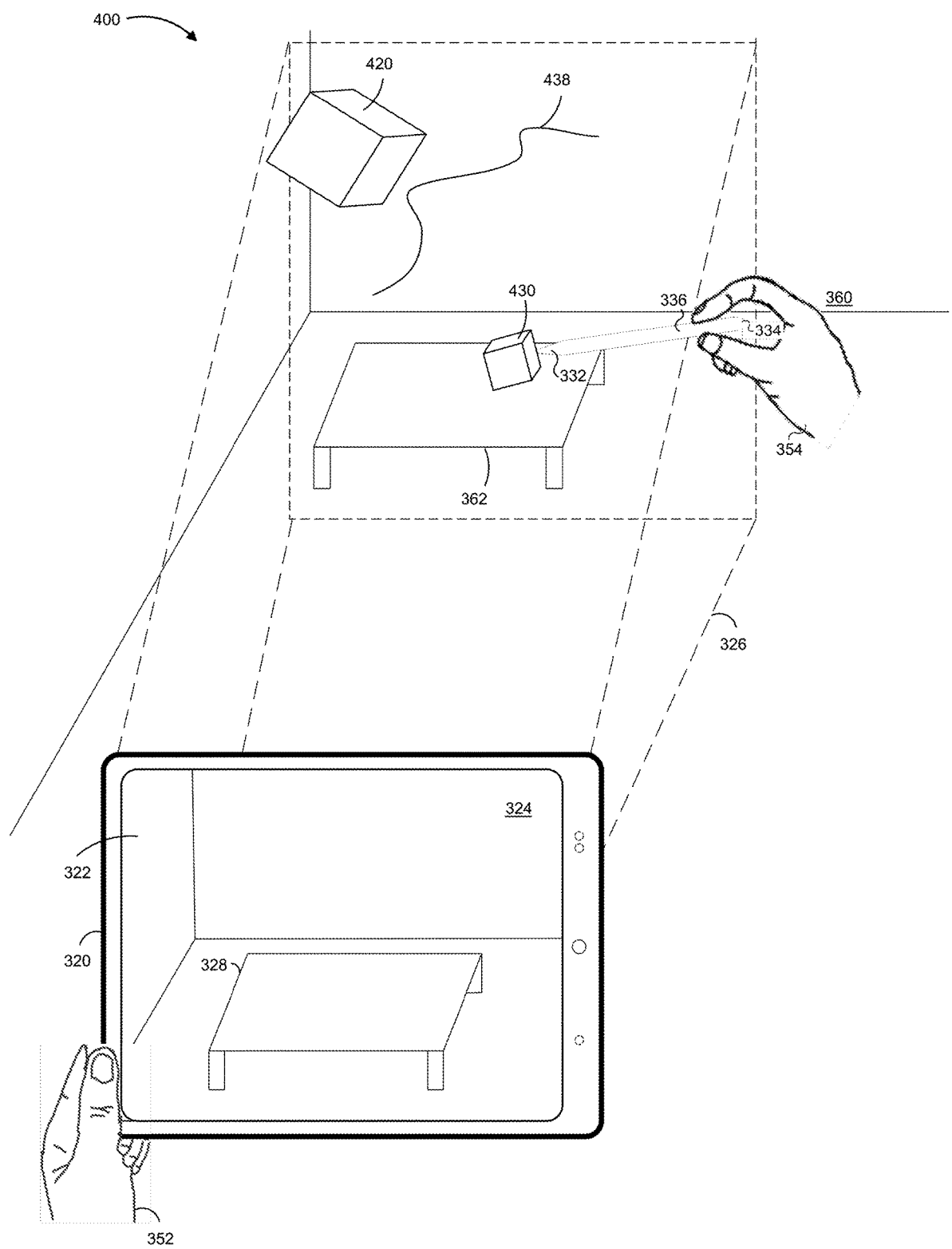

The electronic device 100 includes a communication interface 190 that is provided to communicate with an auxiliary device, such as the auxiliary device 200 illustrated in FIG. 2 or the auxiliary device 330 illustrated in FIGS. 3 and 4A-4S. For example, the communication interface 190 corresponds to one of a BLUETOOTH interface, IEEE 802.11x interface, near field communication (NFC) interface, and/or the like. According to various implementations, the electronic device 100 obtains positional sensor data from the auxiliary device via the communication interface 190, as will be further described below.

FIG. 2 is a block diagram of an example of an auxiliary device 200, such as a stylus or a finger-wearable device. The auxiliary device 200 includes memory 202 (which optionally includes one or more computer readable storage mediums), memory controller 222, one or more processing units (CPUs) 220, peripherals interface 218, RF circuitry 208, and input/output (I/O) subsystem 206. These components optionally communicate over one or more communication buses or signal lines 203. One of ordinary skill in the art will appreciate that the auxiliary device 200 illustrated in FIG. 2 is one example of an auxiliary device, and that the auxiliary device 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

The auxiliary device 200 includes a power system 262 for powering the various components. The power system 262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The memory 202 optionally includes high-speed random-access memory and optionally also includes non-volatile memory, such as one or more flash memory devices, or other non-volatile solid-state memory devices. Access to memory 202 by other components of the auxiliary device 200, such as CPU(s) 220 and the peripherals interface 218, is, optionally, controlled by memory controller 222.

The peripherals interface 218 can be used to couple input and output peripherals of the auxiliary device 200 to the CPU(s) 220 and the memory 202. The one or more processors 220 run or execute various software programs and/or sets of instructions stored in memory 202 to perform various functions for the auxiliary device 200 and to process data.

In some implementations, the peripherals interface 218, the CPU(s) 220, and the memory controller 222 are, optionally, implemented on a single chip, such as chip 204. In some implementations, they are implemented on separate chips.

The RF (radio frequency) circuitry 208 receives and sends RF signals, also called electromagnetic signals. The RF circuitry 208 converts electrical signals to/from electromagnetic signals and communicates with the electronic device 100 or 320, communications networks, and/or other communications devices via the electromagnetic signals. The RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 206 couples input/output peripherals on the auxiliary device 200, such as other input or control devices 216, with the peripherals interface 218. The I/O subsystem 206 optionally includes one or more positional sensor controllers 258, one or more intensity sensor controllers 259, a haptic feedback controller 261, and one or more other input controllers 260 for other input or control devices. The one or more other input controllers 260 receive/send electrical signals from/to other input or control devices 216. The other input or control devices 216 optionally include physical buttons (e.g., push buttons, rocker buttons, etc.), dials, slider switches, click wheels, and so forth. In some implementations, the other input controller(s) 260 are, optionally, coupled with any (or none) of the following: an infrared port and/or a USB port.

In some implementations, the auxiliary device 200 includes one or more positional sensors 266 that output positional sensor data associated with the auxiliary device 200. The positional sensor data is indicative of a position, orientation, or movement of the auxiliary device 200, such as a rotational movement or translational movement of the auxiliary device 200. For example, the positional sensor(s) 266 include an inertial measurement unit (IMU) that provides 3D rotational data, such as roll, pitch, and yaw information. To that end, the IMU may include a combination of an accelerometer, gyroscopes, and magnetometers. As another example, the positional sensor(s) 266 include a magnetic sensor that provides 3D positional data, such as the position of the auxiliary device 200. For example, the magnetic sensor measures weak magnetic fields in order to determine a position of the auxiliary device 200.

In some implementations, the auxiliary device 200 includes one or more pressure sensors 268 for detecting intensity (e.g., force or pressure) of a contact of a finger, wearing the auxiliary device 200, on a physical object. The one or more pressure sensors 268 output pressure sensor data associated with the auxiliary device 200. As one example, the pressure sensor data is indicative of the force or pressure of a tap gesture associated with a finger, which is wearing the auxiliary device 200, tapping on a surface of a physical table. The one or more pressure sensors 268 may include an interferometer. The one or more pressure sensors 268 may include one or more piezoresistive strain gauges, capacitive force sensors, electric force sensors, piezoelectric force sensors, optical force sensors, capacitive touch-sensitive surfaces, or other intensity sensors. Based on receiving data from the one or more pressure sensors 268, an electronic device may determine a gesture performed on the auxiliary device 200, such as a tap gesture, swipe gesture, etc.

The auxiliary device 200 optionally includes one or more tactile output generators 263 for generating tactile outputs on the auxiliary device 200. In some implementations, the term "tactile output" refers to physical displacement of an accessory (e.g., the auxiliary device 200) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the auxiliary device 200) is, optionally, interpreted by the user as a "click" of a physical actuator button. In some cases, a user will feel a tactile sensation such as a "click" even when there is no movement of a physical actuator button associated with the auxiliary device 200 that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

FIG. 2 shows the tactile output generator(s) 263 coupled with a haptic feedback controller 261. The tactile output generator(s) 263 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The tactile output generator(s) 263 receive tactile feedback generation instructions from a haptic feedback system 234 and generates tactile outputs on the auxiliary device 200 that are capable of being sensed by a user of the auxiliary device 200.

In some implementations, the software components stored in the memory 202 include an operating system 226, a communication system (or set of instructions) 228, a position system (or set of instructions) 230, a pressure system (or set of instructions) 232, a haptic feedback system (or set of instructions) 234, and a gesture interpretation system (or set of instructions) 236. Furthermore, in some implementations, the memory 202 stores device/global internal state associated with the auxiliary device 200. The device/global internal state includes one or more of: sensor state, including information obtained from various sensors and other input or control devices 216 of the auxiliary device 200; positional state, including information regarding the position (e.g., position, orientation, tilt, roll and/or distance) of the auxiliary device 200 relative to an electronic device (e.g., the electronic device 100); and location information concerning the absolute position of the auxiliary device 200.

The operating system 226 includes various software components and/or drivers for controlling and managing general system tasks (e.g., memory management, power management, etc.) and facilitates communication between various hardware and software components.

The communication system 228 facilitates communication with other devices (e.g., the electronic device 100 or the electronic device 320), and also includes various software components (e.g., for handling data received by the RF circuitry 208) that are adapted for coupling directly to other devices or indirectly over a network (e.g., the internet, wireless LAN, etc.).

The position system 230, in conjunction with positional sensor data from the one or more positional sensor(s) 266, optionally detects positional information concerning the auxiliary device 200. The position system 230 optionally includes software components for performing various operations related to detecting the position of the auxiliary device 200 and detecting changes to the position of the auxiliary device 200 in a particular frame of reference. In some implementations, the position system 230 detects the positional state of the auxiliary device 200 relative to the electronic device and detects changes to the positional state of the auxiliary device 200 relative to the electronic device. As noted above, in some implementations, the electronic device 100 or 320 determines the positional state of the auxiliary device 200 relative to the electronic device and changes to the positional state of the auxiliary device 200 using information from the position system 230.

The pressure system 232, in conjunction with pressure sensor data from the one or more pressure sensor(s) 268, optionally detects contact intensity information associated with the auxiliary device 200. The pressure system 232 includes software components for performing various operations related to detection of contact, such as detecting the intensity and/or duration of a contact between the auxiliary device 200 and a desk surface. Determining movement of the point of contact, which is represented by a series of pressure data, optionally includes determining speed (magnitude), velocity (magnitude and direction), and/or an acceleration (a change in magnitude and/or direction) of the point of contact.

The haptic feedback system 234 includes various software components for generating instructions used by the tactile output generator(s) 263 to produce tactile outputs at one or more locations on auxiliary device 200 in response to user interactions with the auxiliary device 200.

The auxiliary device 200 optionally includes a gesture interpretation system 236. The gesture interpretation system 236 coordinates with the position system 230 and/or the pressure system 232 in order to determine a gesture performed by the auxiliary device 200. For example, the gesture includes one or more of: a pinch gesture, a pull gesture, a pinch and pull gesture, a rotational gesture, a tap gesture, and/or the like. In some implementations, the auxiliary device 200 does not include a gesture interpretation system, and an electronic device or a system determines a gesture performed by the auxiliary device 200 based on sensor data from the auxiliary device 200. In some implementations, a portion of the gesture determination is performed at the auxiliary device 200, and a portion of the gesture determination is performed at an electronic device/system. In some implementations, the gesture interpretation system 236 determines a time duration associated with a gesture. In some implementations, the gesture interpretation system 236 determines a pressure associated with a gesture, such as an amount of pressure associated with a finger (wearing the auxiliary device 200) tapping on a physical surface.

Each of the above identified modules and applications correspond to a set of executable instructions for performing one or more functions described above and the methods described in this application (e.g., the computer-implemented methods and other information processing methods described herein). These systems (e.g., sets of instructions) need not be implemented as separate software programs, procedures or modules, and thus various subsets of these modules are, optionally, combined or otherwise re-arranged in various embodiments. In some implementations, the memory 202 optionally stores a subset of the systems and data structures identified above. Furthermore, the memory 202 optionally stores additional systems and data structures not described above.

FIG. 3 is an example of a first operating environment 300 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the first operating environment 300 includes an electronic device 320 (e.g., a tablet, mobile phone, laptop, wearable computing device, or the like).

In some implementations, the electronic device 320 corresponds to a head-mountable device (HMD) that includes an integrated display (e.g., a built-in display) that displays a representation of the first operating environment 300. In some implementations, the electronic device 320 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 320). For example, in some implementations, the electronic device 320 slides/snaps into or otherwise attaches to the head-mountable enclosure. In some implementations, the display of the device attached to the head-mountable enclosure presents (e.g., displays) the representation of the first operating environment 300. For example, in some implementations, the electronic device 320 corresponds to a mobile phone that can be attached to the head-mountable enclosure.

In some implementations, the electronic device 320 is configured to manage and coordinate an XR experience (sometimes also referred to herein as a "XR environment" or a "virtual environment" or a "graphical environment") for a user 350 with a left hand 352 and a right hand 354. In some implementations, the electronic device 320 includes a suitable combination of software, firmware, and/or hardware. In some implementations, the electronic device 320 is similar to and adapted from the electronic device 100 described with respect to FIG. 1. In some implementations, the electronic device 320 is a computing device that is local or remote relative to a physical environment 360 that includes a physical table 362.

As illustrated in FIG. 3, the user 350 grasps an auxiliary device 330 using the right hand 354. Examples of the auxiliary device 330 include a stylus, a finger-wearable device, a handheld controller, etc. As illustrated in FIG. 3, the auxiliary device 330 includes a first end 332, a second end 334, and a body 336. In various implementations, the first end 332 corresponds to a tip of the auxiliary device 330 (e.g., the tip of a pencil), and the second end 334 corresponds to the opposite or bottom end of auxiliary device 330 (e.g., the eraser of the pencil). In some implementations, the auxiliary device 330 includes a touch-sensitive surface. For example, the touch-sensitive surface includes one or more pressure sensors (e.g., the pressure sensor(s) 268), which generate pressure sensor data indicative of a touch input. Continuing with this example, while the electronic device 320 is communicatively coupled (e.g., paired) with the auxiliary device 330, the electronic device 320 receives the pressure sensor data from the auxiliary device 330. The electronic device 320 may determine a gesture performed on the auxiliary device 330 based on the pressure sensor data. The electronic device 320 may also determine a grip arrangement characterizing the right hand 354 gripping the auxiliary device 330 based on the pressure sensor data. For example, the electronic device 320 determines a first touch point corresponding to a first finger gripping the auxiliary device 330, and determines a second touch point corresponding to a second finger gripping the auxiliary device 330.

In some implementations, the electronic device 320 is configured to present computer-generated content to the user 350. In some implementations, the electronic device 320 is configured to present, on a display 322, a user interface (UI) and/or an XR environment 324 to the user 350. As illustrated in FIG. 3, the display 322 is associated with a viewable region 326 that includes the physical table 362. Accordingly, the displayed XR environment 324 includes a representation 328 of the physical table 362. For example, the electronic device 320 includes an image sensor (e.g., camera) with a field-of-view (FOV) that approximates the viewable region 326. Continuing with this example, the image sensor captures image data of the physical environment 360 including the physical table 362, and the electronic device 320 composites the image data with computer-generated content. As illustrated in FIG. 3, the computer-generated content includes a volumetric computer-generated cylinder 329, which may be world-locked (e.g., anchored) to the representation 328 of the physical table 362. As another example, the electronic device 320 includes a see-through display 322 (e.g., a transparent lens) that enables ambient light from the physical environment 360 to enter the see-through display 322 for display. In this example, the ambient light includes light reflected off of the physical table 362 towards the see-through display 322.

In some implementations, while the electronic device 320 is paired with the auxiliary device 330, the electronic device 320 utilizes positional sensor data from the auxiliary device 330 in order to track (e.g., determine positions of) the auxiliary device 330. For example, the positional sensor data includes 3D rotational information regarding the auxiliary device 330 (sometimes referred to as roll, pitch, and yaw), and includes translational information regarding the auxiliary device 330 (sometimes referred to as surge, heave, and sway). The positional sensor data may be generated by an IMU of the auxiliary device 330, or a magnetic sensor of the auxiliary device 330. Based on the positional sensor data, the electronic device 320 may perform three degrees of freedom (3 DOF) or six degrees of freedom (6 DOF) tracking of the auxiliary device 330.

In some implementations, the electronic device 320 tracks the auxiliary device 330 based on a computer vision technique, optionally in combination with the positional sensor data from the auxiliary device 330. To that end, in some implementations, the electronic device 320 includes an image sensor that captures image data (e.g., one or more images) including the auxiliary device 330. Moreover, the electronic device 320 identifies a subset of pixels of the image data that correspond to the auxiliary device 330. Examples of the computer vision technique include instance segmentation and semantic segmentation.

FIGS. 4A-4S are examples of anchoring volumetric computer-generated objects to different positions of an auxiliary device in accordance with some implementations. As illustrated in FIG. 4A, a second operating environment 400 includes the physical environment 360, which includes the physical table 362. The second operating environment 400 also includes the right hand 354 holding the auxiliary device 330, including the first end 332, the second end 334, and the body 336. The second operating environment 400 further includes a first volumetric computer-generated cube 420, which the electronic device 320 displays as overlaid onto the surface of the physical table 362. Based on the current orientation and position of the electronic device 320, the viewable region 326 of the display 322 includes the physical table 362 and the right hand 354 holding the auxiliary device 330. For the sake of clarity, however, respective representations of the first volumetric computer-generated cube 420, the right hand 354, the auxiliary device 330, and a second volumetric computer-generated cube 430 are not illustrated on the display 322 in FIGS. 4A-4S. However, one of ordinary skill in the art will appreciate that the display 322 includes these respective representations.

The electronic device 320 determines an anchor point of the auxiliary device 330 based at least in part on dimensions (e.g., size) of a volumetric computer-generated object. For example, with reference to FIG. 4A, the electronic device 320 determines that the size (e.g., volume) of the first volumetric computer-generated cube 420 satisfies (e.g., exceeds) a threshold, and thus sets the anchor point to either the first end 332 or the second end 334, but not the body 336. Foregoing selecting the body 336 prevents the first volumetric computer-generated cube 420 from occluding a substantial portion of the auxiliary device 330. In some implementations, the electronic device 320 sets the anchor point to the first end 332 because the first end 332 is closer to the first volumetric computer-generated cube 420 than is the second end 334. In some implementations, the electronic device 320 sets the anchor point to the first end 332 because the first end 332 is closer to the thumb and index finger that are currently gripping the auxiliary device 330.

In some implementations, the anchor point is further based on relative sizes of the first volumetric computer-generated cube 420 and the auxiliary device 330. For example, the larger the first volumetric computer-generated cube 420 is than the auxiliary device 330, the more likely the anchor point will be set to an end of the auxiliary device 330, rather than to the body 336 of the auxiliary device 330.

In various implementations, the electronic device 320 anchors a volumetric computer-generated object to the anchor point of the auxiliary device 330 based on determining a gesture performed at the auxiliary device 330. For example, as illustrated in FIG. 4B, the right hand 354 performs a first swipe gesture 424 along the body 336 towards the second end 334. The auxiliary device 330 may generate pressure sensor data indicative of the first swipe gesture 424, and transmits the pressure sensor data to the electronic device 320. To that end, each of the electronic device 320 and the auxiliary device 330 includes a communication interface that enables communication with each other. The electronic device 320 receives the pressure sensor data while being communicatively coupled (e.g., paired or tethered) with the auxiliary device 330. Based on the pressure sensor data, the electronic device 320 may determine the first swipe gesture 424. In some implementations, in addition to or instead of determining the first swipe gesture 424 based on the pressure sensor data, the electronic device 320 may determine the first swipe gesture 424 based on a computer vision technique, such as identifying a movement of a finger along the body 336 within image data.

As further illustrated in FIG. 4B, the electronic device 320 may determine, based on positional information regarding the auxiliary device 330, that a direction of the first swipe gesture 424 matches an offset direction 422 between the first volumetric computer-generated cube 420 and the auxiliary device 330. To that end, the electronic device 320 determines the offset direction 422 (illustrated in FIG. 4B for purely explanatory purposes). Namely, the offset direction 422 may indicate the auxiliary device 330 is offset to the right of (e.g., higher x value) and above (e.g., higher y value) the first volumetric computer-generated cube 420. Moreover, the electronic device 320 may further determine, based on the positional information, that the first swipe gesture 424 is associated with a direction that is also rightwards and upwards. For example, the positional information indicates a current orientation of the auxiliary device 330.

Accordingly, based on determining the direction of the first swipe gesture 424 matches the offset direction 422, the electronic device 320 may anchor the first volumetric computer-generated cube 420 to the anchor point (e.g., the first end 332) of the auxiliary device 330, as illustrated in FIG. 4C. In some implementations, the anchoring is further in response to the electronic device 320 determining that the first gesture 424 occurs while the auxiliary device 330 is proximate to (e.g., less than a threshold distance from) the electronic device 320. In some implementations, the anchoring includes displaying an animation of the first volumetric computer-generated cube 420 moving from a first position (illustrated in FIG. 4B) to a second, anchored position (illustrated in FIG. 4C).

According to various implementations, the anchoring includes the electronic device 320 repositioning a volumetric computer-generated object based on a corresponding movement of the auxiliary device 330. For example, as illustrated in FIG. 4D, the right hand 354, while holding the auxiliary device 330, rotates clockwise, as indicated by a rotational movement indicator 426 (illustrated for purely explanatory purposes). The electronic device 320 determines the clockwise rotation based on the positional information. Based on determining the clockwise rotation, the electronic device 320 correspondingly rotates the first volumetric computer-generated cube 420 clockwise. Accordingly, as illustrated in FIG. 4E, upon completion of the clockwise rotation the first volumetric computer-generated cube 420 is rotated clockwise, as compared with FIG. 4D.

In various implementations, the electronic device 320 de-anchors a volumetric computer-generated object from the auxiliary device 330 based on determining a gesture performed at the auxiliary device 330. For example, as illustrated in FIG. 4F, the right hand 354 performs a second swipe gesture 428 along the body 330 away from the second end 334. The electronic device 320 may determine the second swipe gesture 428 based on a combination of pressure sensor data and a computer vision technique, such as is described with reference to the determination of the first swipe gesture 424.

In response to determining the second swipe gesture 428, the electronic device 320 may de-anchor the first volumetric computer-generated cube 420 from the auxiliary device 330. For example, as illustrated in FIGS. 4F and 4G, the electronic device 320 de-anchors the first volumetric computer-generated cube 420 along a de-anchoring line 429 (illustrated for purely explanatory purposes). In some implementations, the length or direction of the de-anchoring line 429 is based on a gesture. For example, for a faster second swipe gesture 428, the electronic device 320 de-anchors the first volumetric computer-generated cube 420 along a longer de-anchoring line 429, optionally with a faster de-anchoring animation. As another example, in some implementations, the direction of the de-anchoring line 429 matches the current lengthwise orientation of the auxiliary device 330 within an error threshold. For example, as illustrated in FIG. 4F, the direction of the de-anchoring line 429 is similar to the lengthwise direction of the auxiliary device 330 during the performance of the second swipe gesture 428.

According to various implementations, the electronic device 320 displays a plurality of volumetric computer-generated objects, and anchors a particular one of the plurality of volumetric computer-generated objects to the auxiliary device 330. For example, as illustrated in FIG. 4H, the electronic device 320 concurrently displays the first volumetric computer-generated cube 420 and a second volumetric computer-generated cube 430. Notably, the first volumetric computer-generated cube 420 is larger (e.g., has different dimensions) than the second volumetric computer-generated cube 430. Additionally, as compared with FIGS. 4G, the right hand 354 has changed its grip arrangement to gripping the auxiliary device 330 closer to the second end 334. The electronic device 320 may determine a grip arrangement (and a change thereof) based on a combination of pressure sensor data from the auxiliary device 330 and a computer vision technique.

In some implementations, the electronic device 320 selects, from the plurality of volumetric computer-generated objects, a particular volumetric computer-generated object to be anchored to the auxiliary device 330. For example, the electronic device 320 selects a particular volumetric computer-generated object that is closest to the auxiliary device 330. As another example, as illustrated in FIG. 4I, the electronic device 320 determines an eye gaze of the user 350 is directed to the second volumetric computer-generated object 430. The eye gaze is indicated by a gaze indicator 432, which may or may not be displayed on the display 322. Based on determining the eye gaze of the user 350 is directed to the second volumetric computer-generated object 430, the electronic device 320 selects the second volumetric computer-generated object 430.

The electronic device 320 determines an anchor point of the auxiliary device 330 based at least in part on a size of the second volumetric computer-generated object 430. For example, the electronic device 320 determines that the size (e.g., volume) of the second volumetric computer-generated cube 430 does not satisfy (e.g., does not exceed) a threshold, and thus sets the anchor point to the body 336.

As illustrated in FIG. 4J, the right hand 354 performs a double tap gesture 434 on the auxiliary device 330. The electronic device 320 may determine the double tap gesture 434 based on a combination of pressure sensor data and a computer vision technique, such as is described with respect to the determination of the first swipe gesture 424. Because the electronic device 320 has selected the second volumetric computer-generated object 430, the electronic device 320 may anchor the second volumetric computer-generated object 430 to the anchor point (e.g., the body 336) in response to determining the double tap gesture 434, as illustrated in FIGS. 4K-4M.

In some implementations, anchoring includes changing an orientation of a volumetric computer-generated object based on an orientation of the auxiliary device 330. For example, as illustrated in FIGS. 4K-4M, in order to anchor the second volumetric computer-generated object 430 substantially parallel to the body 336, the electronic device 320 rotates the second volumetric computer-generated object 430 slightly counterclockwise while moving the second volumetric computer-generated object 430 towards the body 336. Namely, the electronic device 320 moves the second volumetric computer-generated object 430 along a curved anchoring line 435 (illustrated for purely explanatory purposes), terminating at the body 336 in FIG. 4M.

By anchoring the second volumetric computer-generated object 430 to the body 336, the first end 332 and the second end 334 remain useable for other purposes. For example, as illustrated in FIG. 4N, while anchoring the second volumetric computer-generated object 430 to the body 336, the first end 332 (e.g., a tip of a stylus) performs a drawing operation 436 with respect to the wall of the physical environment 360. Accordingly, as illustrated in FIG. 4O, the electronic device 320 displays a drawing mark 438 (e.g., an overlay on the wall) corresponding to the drawing operation 436.

In some implementations, the electronic device 320 changes a position of an anchor point based on determining a gesture performed on the auxiliary device. For example, as illustrated in FIG. 4P, the second hand 354 performs a single tap gesture 440 on the auxiliary device 330. The electronic device 320 may determine the single tap gesture 440 based on a combination of pressure sensor data and a computer vision technique, such as is described with respect to the determination of the first swipe gesture 424. In response to determining the single tap gesture 440, the electronic device 320 changes the anchor point from the body 336 to the first end 332. Accordingly, as illustrated in FIG. 4Q, the second volumetric computer-generated object 430 changes from being anchored to the body 336 to being anchored to the first end 332.

As illustrated in FIG. 4R, while anchoring the second volumetric computer-generated object 430 to the first end 332, the electronic device 320 determines a translational movement, as indicated by a translational movement indicator 442 (illustrated for purely explanatory purposes). Based on the translational movement, the electronic device 320 repositions the second volumetric computer-generated object 430, as illustrated in FIG. 4S.

Figure 5:
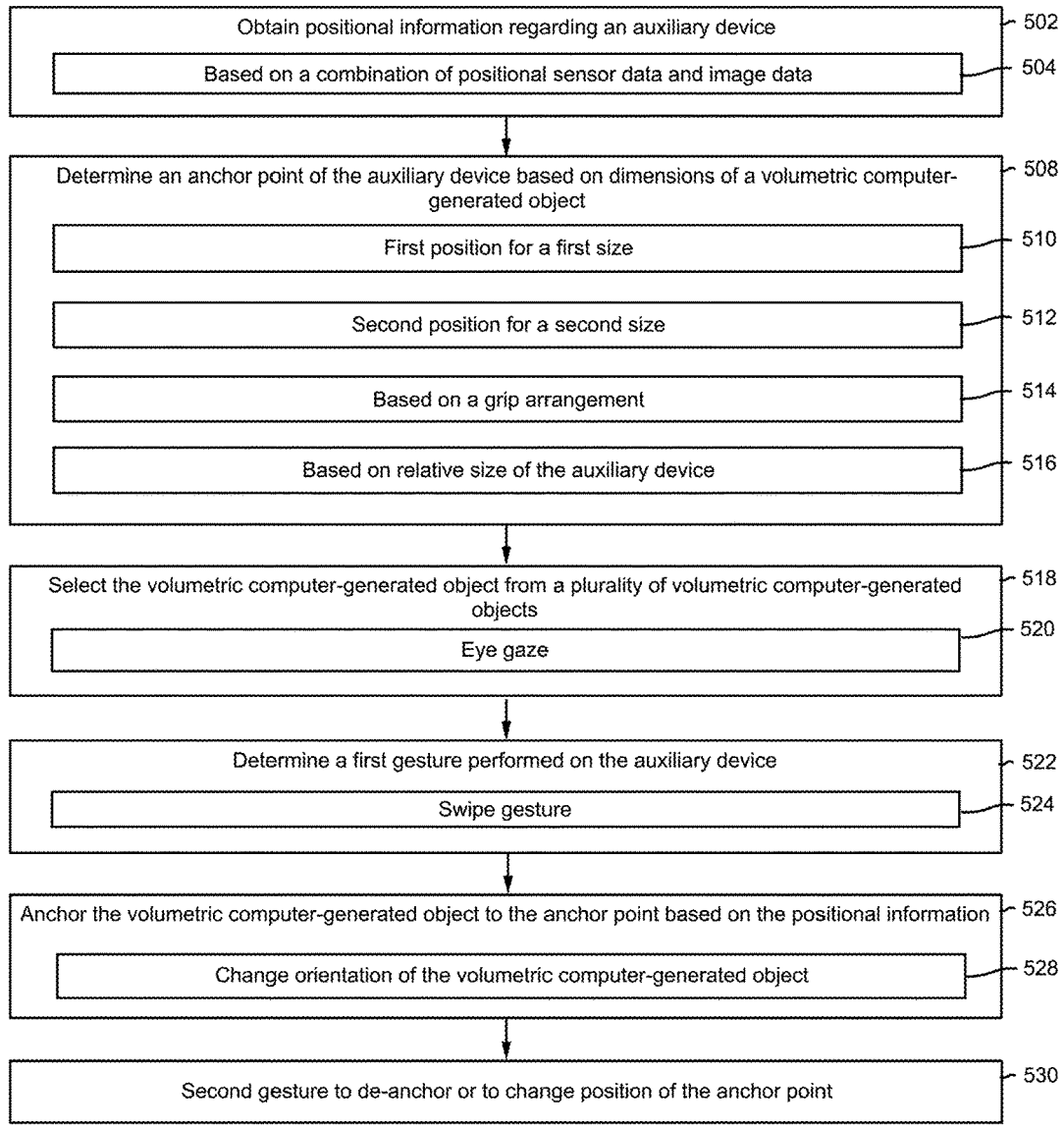
FIG. 5 is an example of a flow diagram of a method of anchoring a volumetric computer-generated object to an anchor point of an auxiliary device in accordance with some implementations.

FIG. 5 is an example of a flow diagram of a method 500 of anchoring a volumetric computer-generated object to an anchor point of an auxiliary device in accordance with some implementations. In various implementations, the method 500 or portions thereof are performed by an electronic device (e.g., the electronic device 100 in FIG. 1 or the electronic device 320 in FIGS. 3 and 4A-4S). In various implementations, the method 500 or portions thereof are performed by a head-mountable device (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes obtaining positional information regarding an auxiliary device. The positional information may indicate position(s) or orientation(s) of the auxiliary device in an XR environment or in a purely physical environment. In some implementations, obtaining positional information includes performing 3 DOF or 6 DOF tracking of the auxiliary device. The 6 DOF includes three degrees of freedom regarding translational movements, and three degrees of freedom regarding rotational movements.

In some implementations, as represented by block 504, the positional information is based on a combination of positional sensor data and image data. To that end, in some implementations, an electronic device performing the method 500 includes a communication interface (e.g., the communication interface 190 in FIG. 1) that enables communication with the auxiliary device. While the electronic device is communicatively coupled with the auxiliary device via the communication interface, the electronic device obtains positional sensor data from a positional sensor of the auxiliary device. For example, with reference to FIG. 2, the positional sensor(s) 266 generate the positional sensor data. Moreover, the electronic device may include an image sensor (e.g., a camera) that captures image data including the auxiliary device. For example, with reference to FIG. 4A, the electronic device 320 includes an image sensor having a field of view (FOV) that approximates the viewable region 326, and thus the FOV includes the auxiliary device 330. The method 500 may include performing a computer vision technique based on the image data. Moreover, in some implementations, the method 500 includes performing a computer vision technique based on a combination of the positional sensor data and the image data.

As represented by block 508, the method 500 includes determining an anchor point of the auxiliary device based on dimensions of (e.g., size of) a volumetric computer-generated object. As represented by block 510, determining the anchor point includes setting the anchor point to a first position of the auxiliary device in accordance with a determination that dimensions of the volumetric computer-generated object satisfy a first criterion. For example, as described with reference to FIG. 4A, the electronic device 320 sets the anchor point to the first end 322 of the auxiliary device, based on the relatively large size of the first volumetric computer-generated cube 420. As represented by block 512, determining the anchor point includes setting the anchor point to a second position of the auxiliary device in accordance with a determination that the dimensions of the volumetric computer-generated object satisfy a second criterion different from the first criterion. The second position is different from the first position. For example, with reference to FIG. 4H, the electronic device 320 sets the anchor point to the body 336 of the auxiliary device, based on the relatively small size of the second volumetric computer-generated cube 430.

In some implementations, the difference between the first position and the second position is based on the first size satisfying a threshold and the second size not satisfying the threshold. For example, the first volumetric computer-generated cube 420 is of a first size (e.g., a first volume) that satisfies the threshold because the first size exceeds the threshold. As a counterexample, the second volumetric computer-generated cube 430 is of a second size (e.g., a second volume) that does not satisfy the threshold because the second size does not exceed the threshold.

As represented by block 514, in some implementations, determining the anchor point is further based on a grip arrangement. The grip arrangement may characterize a grip style of a hand of a user gripping the auxiliary device. To that end, in some implementations, the method 500 includes determining the grip arrangement. For example, based on pressure sensor data from an auxiliary device, an electronic device determines how many fingers are gripping the auxiliary device, and the positions of the gripping fingers. As one example, with reference to FIGS. 4G and 4H, the electronic device 320 determines that the grip arrangement moves to being closer to the second end 334. Based on the change of the grip arrangement, the electronic device 320 determines that less of the right hand 354 occludes the body 336 of the auxiliary device 330, thereby making the body 336 more suitable as an anchor point.

As represented by block 516, in some implementations, determining the anchor point is further based on relative sizes of the volumetric computer-generated object and the auxiliary device. For example, the larger the volumetric computer-generated object is relative to the auxiliary device, the more likely that the anchor point will be set to an end (rather than body) of the auxiliary device. On the other hand, the smaller the volumetric computer-generated object is relative to the auxiliary device, the more likely that the anchor point will be set to the body (rather than an end) of the auxiliary device.

In some implementations, determining the anchor point is further based on dimensions of a first volumetric computer-generated object relative to dimensions of a second volumetric computer-generated object. For example, an elongated cylinder may be more likely to get anchored to the tip along the same axis as an auxiliary device, while a smaller cube or a smaller sphere may be more likely to get anchored to the body of the auxiliary device.

As represented by block 518, in some implementations, the method 500 includes selecting the volumetric computer-generated object for anchoring. For example, in response to determining a gesture on the auxiliary device that is performed less a threshold amount of time after selecting the volumetric computer-generated object, the method 500 includes anchoring the volumetric computer-generated object to the auxiliary device. As represented by block 520, in some implementations, selecting the volumetric computer-generated object is based on an eye gaze of a user of an electronic device performing the method 500. To that end, the method 500 may include determining that the eye gaze is directed to the volumetric computer-generated object. For example, the method 500 includes determining that the eye gaze is within the boundary of the volumetric computer-generated object for at least a threshold amount of time.

In some implementations, the method 500 includes displaying a plurality of volumetric computer-generated objects, and selecting a particular one of the plurality of volumetric computer-generated objects for anchoring. For example, with reference to FIG. 4I, while the electronic device 320 concurrently displays the first volumetric computer-generated cube 420 and the second volumetric computer-generated cube 430, the electronic device 320 determines that the eye gaze 432 is directed to the second volumetric computer-generated cube 430. Accordingly, the electronic device 320 selects the second volumetric computer-generated cube 430 for anchoring, which is initiated via the double tap gesture 434 illustrated in FIG. 4J.

As represented by block 522, in some implementations, the method 500 includes determining a first gesture performed on the auxiliary device. The method 500 may include determining the first gesture via a combination of sensor data (e.g., positional sensor data or pressure sensor data) from the auxiliary device and a computer vision technique. For example, the pressure sensor data indicates a position or movement of a finger of a hand holding the auxiliary device. As another example, the computer vision technique includes identifying a plurality of pixel subsets across a plurality of images, wherein each of the plurality of pixel subsets corresponds to a finger of a hand holding the auxiliary device. Continuing with this example, the computer vision technique includes determining differences among the plurality of pixel subsets in order to determine a movement of the finger.

In some implementations, the first gesture may include a tap of a finger holding the auxiliary device. For example, the first gesture corresponds to the double tap gesture 434 illustrated in FIG. 4J.

In some implementations, the first gesture may include a movement of a finger of a hand holding the auxiliary device, such as a swipe gesture. For example, as represented by block 524, in some implementations, the first gesture corresponds to a swipe gesture. As one example, the swipe gesture requests the volumetric computer-generated object to be pulled towards the auxiliary device. To that end, the method 500 may include determining, based on the positional information, that a direction of the swipe gesture matches an offset direction between the volumetric computer-generated object and the auxiliary device within an error threshold. For example, as illustrated in FIG. 4B, the electronic device 320 may determine, based on the positional information, that a direction of the first swipe gesture 424 matches an offset direction 422 between the first volumetric computer-generated cube 420 and the auxiliary device 330 within the error threshold.

As represented by block 526, the method 500 includes anchoring, based on the positional information, the volumetric computer-generated object to the anchor point of the auxiliary device. For example, anchoring corresponds to an object-locked mode, in which the volumetric computer-generated object is locked to the auxiliary device. The anchoring includes manipulating the volumetric computer-generated object based on determining a corresponding movement of the auxiliary device. For example, while the auxiliary device is at a first location of an environment, the method 500 includes displaying the volumetric computer-generated object at the anchor point of the auxiliary device at the first location. Continuing with this example, the method 500 includes determining a movement of the auxiliary device from the first location to a second location of the environment, based on the positional information. Thus, the method 500 includes repositioning the volumetric computer-generated object to the anchor point of the auxiliary device at the second location. As another example, based on determining a clockwise rotation indicated by the rotational movement indicator 426 of the auxiliary device 330 in FIG. 4D, the electronic device 320 correspondingly repositions the first volumetric computer-generated cube 420 in FIG. 4E. As yet another example, based on determining the translational movement indicated by the translational movement indicator 442 in FIG. 4R, the electronic device 320 correspondingly repositions the second volumetric computer-generated cube 430 in FIG. 4S.

In some implementations, anchoring the volumetric computer-generated object to the anchor point is based on an eye gaze of a user, as described with reference to blocks 518 and 520. For example, the method 500 includes anchoring a first volumetric computer-generated object (not a second volumetric computer-generated object) based on the eye gaze selecting the first volumetric computer-generated object.

In some implementations, anchoring the volumetric computer-generated object to the anchor point is in response to determining the first gesture, which is described with reference to blocks 522 and 524.

In some implementations, anchoring the volumetric computer-generated object to the anchor point is in response to determining the auxiliary device satisfies a proximity threshold with respect to the volumetric computer-generated object. To that end, the method 500 includes, while displaying the volumetric computer-generated object on the display, determining, based on the positional information, that the auxiliary device satisfies the proximity threshold with respect to the volumetric computer-generated object. For example, determining the auxiliary device satisfies the proximity threshold includes determining the auxiliary device is less than a threshold distance from the volumetric computer-generated object.

In some implementations, anchoring the volumetric computer-generated object to the anchor point includes displaying an animation of the volumetric computer-generated object. For example, before anchoring the volumetric computer-generated object, the method 500 includes displaying the volumetric computer-generated object at an initial position that is offset from the auxiliary device. Continuing with this example, anchoring the volumetric computer-generated object to the auxiliary device includes displaying an animation of the volumetric computer-generated object moving from the initial position towards the anchor point of the auxiliary device.

As represented by block 528, in some implementations, anchoring the volumetric computer-generated object includes changing an orientation of the volumetric computer-generated object based on the orientation of the auxiliary device. To that end, the method 500 may include determining an orientation of the auxiliary device based on the positional information. As one example, as illustrated in FIGS. 4K-4M, the electronic device 320 changes the orientation of the second volumetric computer-generated cube 430 by rotating the second volumetric computer-generated cube 430 in a counterclockwise direction. Rotating the second volumetric computer-generated cube 430 in a counterclockwise direction results in the second volumetric computer-generated cube 430 being substantially parallel to the body 336, as illustrated in FIG. 4M.

As represented by block 530, in some implementations, the method 500 includes de-anchoring the volumetric computer-generated object from the anchor point or changing the position of the anchor point, based on a second gesture performed on the auxiliary device. The method 500 may include determining the second gesture via a combination of sensor data (e.g., positional sensor data or pressure sensor data) from the auxiliary device and a computer vision technique.

For example, the method 500 may include, while anchoring the volumetric computer-generated object to the first position, changing the anchor point to a second position, based on a second gesture. For example, based on determining the single tap gesture 440 in FIG. 4P, the electronic device 320 changes the anchor point from the body 336 to the first end 332 in FIG. 4Q.

As another example, the method 500 may include, while anchoring the volumetric computer-generated object to the anchor point, de-anchoring the volumetric computer-generated object from the anchor point based on a second gesture. In some implementations, de-anchoring is in response to determining that the first gesture (described with reference to blocks 522 and 524) and the second gesture are of a common gesture type. For example, the first swipe gesture 424 initiates the anchoring in FIGS. 4B and 4C, and the second swipe gesture 428 initiates the de-anchoring in FIGS. 4F and 4G. Accordingly, in some implementations, swiping in a first direction along an auxiliary device initiates an anchoring, whereas swiping in a different, second direction along the auxiliary device initiates a de-anchoring.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including a non-transitory memory, one or more processors, and a display:
obtaining positional information regarding an auxiliary device;
determining an anchor point of the auxiliary device based on a volumetric computer-generated object, wherein determining the anchor point comprises:
setting the anchor point to a first position of the auxiliary device in accordance with a determination that dimensions of the volumetric computer-generated object satisfy a first criterion; and
setting the anchor point to a second position of the auxiliary device in accordance with a determination that the dimensions of the volumetric computer-generated object satisfy a second criterion different from the first criterion, wherein the first position is different from the second position; and
anchoring, based on the positional information, the volumetric computer-generated object to the anchor point of the auxiliary device.

2. The method of claim 1, wherein the auxiliary device includes a body and an end, wherein the first position corresponds to a position within the body, and wherein the second position corresponds to a position within the end.

3. The method of claim 1, wherein the difference between the first position and the second position is based on the dimensions satisfying a size threshold.

4. The method of claim 1, wherein determining the anchor point is further based on relative sizes of the volumetric computer-generated object and the auxiliary device.

5. The method of claim 1, further comprising determining a grip arrangement characterizing a user gripping the auxiliary device, wherein determining the anchor point of the auxiliary device is further based on the grip arrangement.

6. The method of claim 1, wherein the electronic device includes a communication interface provided to communicate with the auxiliary device, wherein the electronic device includes an image sensor, and wherein obtaining the positional information comprises:
obtaining positional sensor data from the auxiliary device via the communication interface;
capturing, via the image sensor, image data depicting the auxiliary device; and
determining the positional information based on the positional sensor data and the image data.

7. The method of claim 1, wherein anchoring the volumetric computer-generated object includes:
while the auxiliary device is at a first location of an environment, displaying the volumetric computer-generated object at the anchor point of the auxiliary device at the first location;
determining a movement of the auxiliary device from the first location to a second location of the environment, based on the positional information; and
repositioning the volumetric computer-generated object to the anchor point of the auxiliary device at the second location.

8. The method of claim 1, wherein the electronic device includes a communication interface provided to communicate with the auxiliary device, the method further comprising:
obtaining sensor data from the auxiliary device via the communication interface; and
determining a first gesture performed on the auxiliary device based on the sensor data;
wherein the anchoring is in response to determining the first gesture.

9. The method of claim 8, wherein the first gesture corresponds to a swipe gesture along the auxiliary device, and the anchoring is in further response to determining, based on respective positions of the volumetric computer-generated object and the auxiliary device, that the swipe gesture requests the volumetric computer-generated object to be pulled towards the auxiliary device.

10. The method of claim 9, wherein determining that the swipe gesture requests the volumetric computer-generated object to be pulled towards the auxiliary device includes, determining, based on the positional information, that a direction of the swipe gesture matches an offset direction between the volumetric computer-generated object and the auxiliary device within an error threshold.

11. The method of claim 8, further comprising:
while anchoring the volumetric computer-generated object to the first position, determining a second gesture performed on the auxiliary device based on the sensor data;
changing the position of the anchor point based on the second gesture.

12. The method of claim 8, further comprising:
while anchoring the volumetric computer-generated object to the anchor point, determining a second gesture performed on the auxiliary device based on the sensor data; and
in response to determining the second gesture, de-anchoring the volumetric computer-generated object from the anchor point.

13. The method of claim 8, further comprising, while displaying the volumetric computer-generated object:
  before determining the first gesture, determining that an eye gaze is directed to the volumetric computer-generated object;
  wherein the anchoring is further in response to determining that the eye gaze is directed to the volumetric computer-generated object.

14. The method of claim 13, further comprising, while concurrently displaying a plurality of volumetric computer-generated objects including the volumetric computer-generated object:
  selecting, from the plurality of volumetric computer-generated objects, the volumetric computer-generated object based on determining that the eye gaze is directed to the volumetric computer-generated object;
  wherein the anchoring is further in response to the selection.

15. The method of claim 1, further comprising, while displaying the volumetric computer-generated object on the display:
  determining, based on the positional information, whether the auxiliary device satisfies a proximity threshold with respect to the volumetric computer-generated object;
  wherein the anchoring is in response to determining the auxiliary device satisfies the proximity threshold.

16. The method of claim 1, further comprising determining an orientation of the auxiliary device based on the positional information, wherein anchoring the volumetric computer-generated object includes changing an orientation of the volumetric computer-generated object based on the orientation of the auxiliary device.

17. The method of claim 1, further comprising, before anchoring the volumetric computer-generated object, displaying the volumetric computer-generated object at an initial position that is offset from the auxiliary device, wherein anchoring the volumetric computer-generated object to the auxiliary device includes displaying an animation of the volumetric computer-generated object moving from the initial position towards the auxiliary device.

18. An electronic device comprising:
  one or more processors;
  a non-transitory memory;
  a display; and
  one or more programs, wherein the one or more programs are stored in the non-transitory memory and configured to be executed by the one or more processors, the one or more programs including instructions for:
    obtaining positional information regarding an auxiliary device;
    determining an anchor point of the auxiliary device based on a volumetric computer-generated object, wherein determining the anchor point includes:
      setting the anchor point to a first position of the auxiliary device in accordance with a determination that dimensions of the volumetric computer-generated object satisfy a first criterion; and
      setting the anchor point to a second position of the auxiliary device in accordance with a determination that the dimensions of the volumetric computer-generated object satisfy a second criterion different from the first criterion, wherein the first position is different from the second position; and
    anchoring, based on the positional information, the volumetric computer-generated object to the anchor point of the auxiliary device.

19. The electronic device of claim 18, wherein the auxiliary device includes a body and an end, wherein the first position corresponds to a position within the body, and wherein the second position corresponds to a position within the end.

20. A non-transitory computer readable storage medium storing one or more programs, the one or more programs comprising instructions, which, when executed by an electronic device with one or more processors and a display, cause the electronic device to:
  obtain positional information regarding an auxiliary device;
  determine an anchor point of the auxiliary device based on a volumetric computer-generated object, wherein determining the anchor point includes:
    setting the anchor point to a first position of the auxiliary device in accordance with a determination that dimensions of the volumetric computer-generated object satisfy a first criterion; and
    setting the anchor point to a second position of the auxiliary device in accordance with a determination that the dimensions of the volumetric computer-generated object satisfy a second criterion different from the first criterion, wherein the first position is different from the second position; and
  anchoring, based on the positional information, the volumetric computer-generated object to the anchor point of the auxiliary device.

* * * * *